US009557503B2

(12) United States Patent
Guenter et al.

(10) Patent No.: US 9,557,503 B2
(45) Date of Patent: Jan. 31, 2017

(54) OPTICAL FIBER CABLE

(71) Applicant: Corning Optical Communications LLC, Hickory, NC (US)

(72) Inventors: Cory Fritz Guenter, Conover, NC (US); Harold Edward Hudson, II, Conover, NC (US); William Carl Hurley, Hickory, NC (US); Rebecca Elizabeth Sistare, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/818,611

(22) Filed: Aug. 5, 2015

(65) Prior Publication Data
US 2016/0041354 A1   Feb. 11, 2016

Related U.S. Application Data

(60) Provisional application No. 62/053,340, filed on Sep. 22, 2014, provisional application No. 62/035,016, filed on Aug. 8, 2014.

(51) Int. Cl.
G02B 6/36 (2006.01)
G02B 6/44 (2006.01)
G02B 6/40 (2006.01)

(52) U.S. Cl.
CPC ............ *G02B 6/4432* (2013.01); *G02B 6/40* (2013.01); *G02B 6/4413* (2013.01);
(Continued)

(58) Field of Classification Search
None
See application file for complete search history.

(56) References Cited

U.S. PATENT DOCUMENTS 4,141,623 A    2/1979  Dubost et al.
5,345,526 A *  9/1994  Blew ................... G02B 6/4482
                                                  385/100
(Continued)

FOREIGN PATENT DOCUMENTS

CN    201689204 U   12/2010
CN    202600212 U   12/2012
(Continued)

OTHER PUBLICATIONS

W.A. Yates, W.C. Hurley, "Development of Cable and Connectivity Solutions," Proceedings of the 60th IWCS, 2011, pp. 212-221.
(Continued)

Primary Examiner — Sung Pak
(74) Attorney, Agent, or Firm — William D. Doyle

(57) ABSTRACT

An optical communication cable is provided. The optical communication cable includes an outer cable layer and a plurality of optical fiber bundles surrounded by the outer cable layer. Each optical fiber bundle includes a bundle jacket surrounding a plurality of optical fiber subunits located within the bundle passage. The plurality of optical subunits are wrapped around each other within the bundle passage forming a wrapped pattern. Each optical fiber subunit includes a subunit jacket surrounding a elongate optical fiber located within the subunit passage. The cable jacket, bundle jacket and subunit jacket may be fire resistant, and strength strands of differing lengths may be located in the bundles and the subunits.

42 Claims, 11 Drawing Sheets

(52) U.S. Cl.
CPC ......... *G02B 6/4434* (2013.01); *G02B 6/4436* (2013.01); *G02B 6/4494* (2013.01); *G02B 6/4495* (2013.01)

(56) References Cited

U.S. PATENT DOCUMENTS

| | | | |
|---|---|---|---|
| 5,751,879 A * | 5/1998 | Graham | G02B 6/441 |
| | | | 174/107 |
| 6,205,277 B1 * | 3/2001 | Mathis | G02B 6/449 |
| | | | 385/102 |
| 6,901,191 B2 | 5/2005 | Hurley et al. | |
| 6,937,801 B2 | 8/2005 | McAlpine et al. | |
| 7,054,531 B2 | 5/2006 | Hurley et al. | |
| 7,113,680 B2 | 9/2006 | Hurley et al. | |
| 8,380,029 B2 | 2/2013 | Cline et al. | |
| 8,494,327 B2 | 7/2013 | Keller et al. | |
| 8,582,944 B2 | 11/2013 | Haataja et al. | |
| 2009/0129733 A1 | 5/2009 | Keller et al. | |
| 2009/0263089 A1 * | 10/2009 | Keller | G02B 6/4484 |
| | | | 385/109 |
| 2012/0281955 A1 | 11/2012 | Hudson et al. | |

FOREIGN PATENT DOCUMENTS

| | | |
|---|---|---|
| EP | 1359449 A2 | 11/2003 |
| EP | 2287646 | 8/2010 |
| WO | 2011081771 | 7/2011 |

OTHER PUBLICATIONS

International Search Report and Written Opinion of the International Searching Authority; PCT/US2015/050833; Mailed March 9, 2016; 16 pages.

Patent Cooperation Treaty, Invitation to Pay Additional Fees for PCT/US2015/050833, mail date Dec. 18, 2015, 7 pages.

* cited by examiner

OPTICAL FIBER CABLE

PRIORITY APPLICATION

This application claims the benefit of priority under 35 U.S.C. §119 of U.S. Provisional Application No. 62/035,016, filed on Aug. 8, 2014, and U.S. Provisional Application No. 62/053,340, filed on Sep. 22, 2014, the content of each of which is relied upon and incorporated herein by reference in their entirety.

BACKGROUND

The disclosure relates generally to optical communication cables and more particularly to optical communication cables including multiple optical fiber subunits. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable. The optical communication cable includes an outer cable layer and a plurality of optical fiber bundles surrounded by the outer cable layer. Each optical fiber bundle includes a bundle jacket defining a bundle passage, a first tensile strength strand located within the bundle passage and a plurality of optical fiber subunits located within the bundle passage. The pluralities of optical subunits are wrapped around each other within the bundle passage forming a wrapped pattern. Each optical fiber subunit includes a subunit jacket defining a subunit passage, a second tensile strength strand located within the subunit passage and an elongate optical fiber located within the subunit passage. The first tensile strength strand of each optical fiber bundle is located outside of the jackets of the optical fiber subunits. A length of the second tensile strength strand is substantially the same as a length of the elongate optical fiber. A length of the first tensile strength strand is less than the length of the second tensile strength strand and the length of the elongate optical fiber.

An additional embodiment of the disclosure relates to a high density fire resistant optical communication cable. The cable includes a cable body including a body passage within the cable body, and the cable body is formed from a fire resistant polymer material. The cable includes a plurality of optical fiber bundles located within the body passage. Each optical fiber bundle includes a bundle jacket formed from a fire resistant polymer material and defines a bundle passage. Each optical fiber bundle includes a plurality of optical fiber subunits located with the bundle passage. Each optical fiber subunit includes a subunit jacket formed from a fire resistant polymer material defining a subunit passage and a plurality of elongate optical fibers located within the subunit passage. The plurality of optical fiber bundles includes an outer group of optical fiber bundles and an inner group of optical fiber bundles, and the inner group of optical fiber bundles is wrapped around each other forming a first wrapped pattern that includes at least one spirally wrapped section having a first pitch length. The outer group of optical fiber bundles surround and are wrapped around the inner group of optical fiber bundles forming a second wrapped pattern that includes at least one spirally wrapped section having a second pitch length. The second pitch length is greater than the first pitch length such that a total length of each optical fiber of the outer group of optical fiber bundles is substantially the same as a total length of each optical fiber of the inner group of optical fiber bundles within at least one 1 meter length of the cable.

An additional embodiment of the disclosure relates to a high density fire resistant optical communication cable. The cable includes a cable body including a body passage within the cable body, and the cable body is formed from a fire resistant polymer material. The cable includes a plurality of optical fiber bundles located within the body passage. Each optical fiber bundle includes a bundle jacket formed from a fire resistant polymer material and defines a bundle passage. Each optical fiber bundle includes a first tensile strength strand located and unstranded within the bundle passage and a plurality of optical fiber subunits located with the bundle passage. Each optical fiber subunit includes a subunit jacket formed from a fire resistant polymer material defining a subunit passage, a second tensile strength strand located and unstranded within the subunit passage and a plurality of elongate optical fibers located within the subunit passage. The plurality of optical fiber bundles includes an outer group of optical fiber bundles and an inner group of optical fiber bundles, and the inner group of optical fiber bundles is wrapped around each other forming a first wrapped pattern that includes at least one spirally wrapped section having a first pitch length. The outer group of optical fiber bundles surround and are wrapped around the inner group of optical fiber bundles forming a second wrapped pattern that includes at least one spirally wrapped section having a second pitch length. The second pitch length is greater than the first pitch length such that a total length of each optical fiber of the outer group of optical fiber bundles is substantially the same as a total length of each optical fiber of the inner group of optical fiber bundles. The first tensile strength strand of each optical fiber bundle is located outside of the subunit jackets. A length of each second tensile strength strand is substantially the same as a length of the elongate optical fibers of the optical fiber subunit in which the second tensile strength strand is located. A length of each first tensile strength strand is less than the length of at least one elongate optical fiber. The total number of elongate optical fibers within the cable body is at least 288 and a greatest outer dimension of the cable body is less than 30 mm.

An additional embodiment of the disclosure relates to an optical communication cable including outer cable layer and a first tensile strength strand surrounded by the outer cable layer. The cable includes a plurality of optical transmission units surrounded by the outer cable layer. Each optical transmission unit includes an inner jacket defining a passage, at least one elongate optical fiber located within the passage and a second tensile strength strand located within the passage. The first tensile strength strand is located outside of the inner jackets of the optical transmission units. A length of the first tensile strength strand is less than a length of the second tensile strength strands and is also less than a length of the elongate optical fiber of each of the optical transmission units.

An additional embodiment of the disclosure relates to optical communication cable. The cable includes a cable body including a body passage within the cable body and a plurality of optical transmission units located within the body passage. Each optical transmission unit includes at least one optical fiber. The plurality of optical transmission units include an outer group of optical transmission units and an inner group of optical transmission units. The inner group of optical transmission units is wrapped around each other forming a first wrapped pattern that includes at least one spirally wrapped section having a first pitch length. The outer group of optical transmission units surround and are wrapped around the inner group of optical transmission units forming a second wrapped pattern that includes at least one spirally wrapped section having a second pitch length. The second pitch length is greater than the first pitch length such that a total length of each optical fiber of the outer group of optical transmission units is substantially the same as a total length of each optical fiber of the inner group of optical transmission units within at least one 1 meter length of the cable.

An additional embodiment of the disclosure relates to optical communication cable assembly. The optical communication cable assembly includes an outer cable jacket, a plurality of first tensile strength strands surrounded by the outer cable jacket and a plurality of optical transmission units surrounded by the outer cable jacket. Each optical transmission unit includes an inner jacket defining a passage, at least one elongate optical fiber located within the passage and a second tensile strength strand located within the passage. The first tensile strength strands are located outside of the inner jackets of the optical transmission units. Lengths of the first tensile strength strands are less than lengths of the second tensile strength strands and are less than lengths of the elongate optical fiber of each of the optical transmission units. The optical communication cable assembly includes a furcation plug. The outer cable jacket is coupled to a first end of the furcation plug such that the outer cable jacket terminates at the furcation plug and that each of the optical transmission units extends out of a second end of the furcation plug such that an outer surface of the outer cable jacket defines an outermost surface of the assembly on an upstream side of the furcation plug. The first tensile strands are bonded to the furcation plug such that tension applied to the furcation plug is borne at least in part by the first tensile strength strands.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
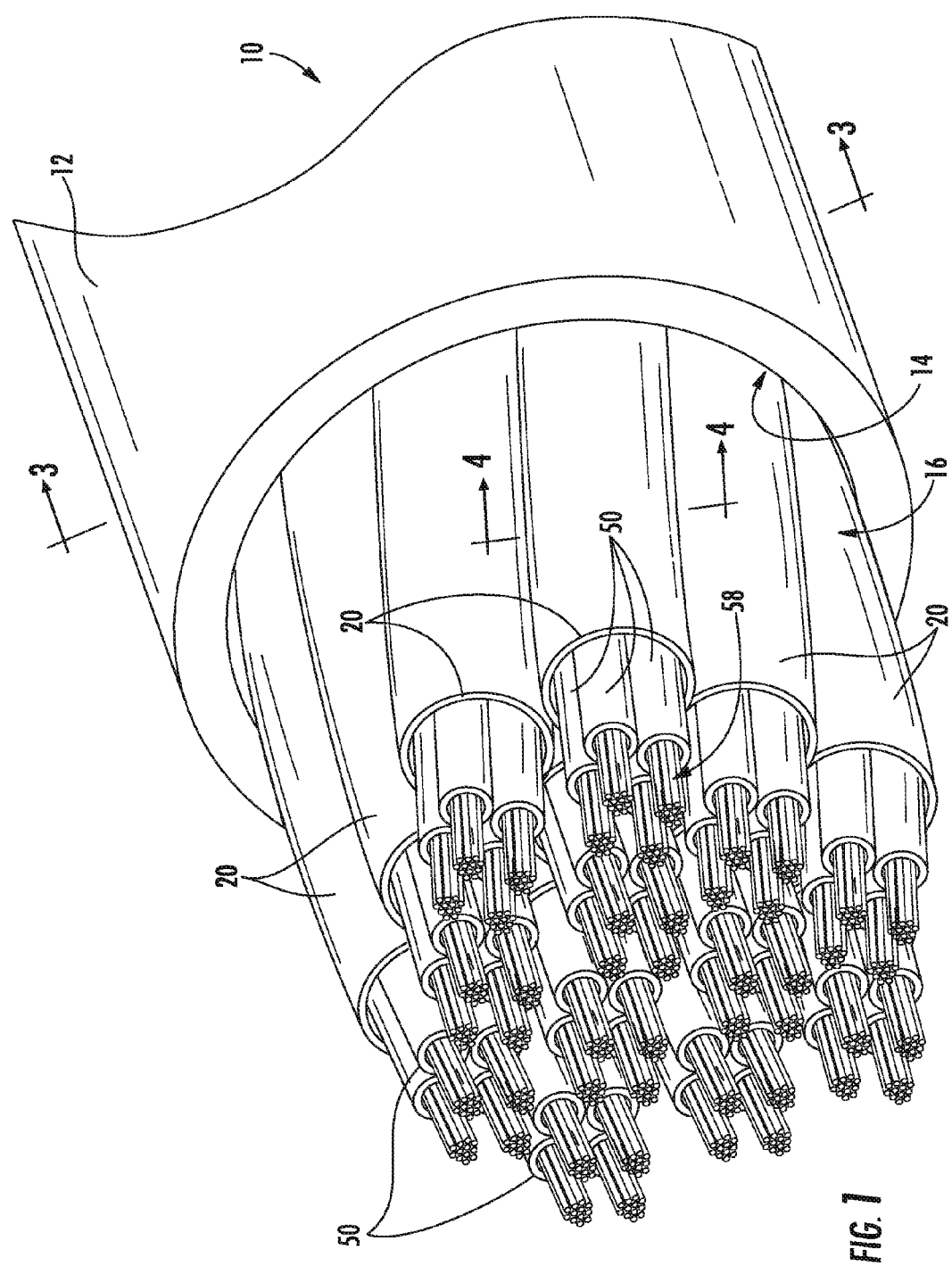
FIG. 1 is a perspective view of an optical fiber cable according to an exemplary embodiment.

Referring generally to the figures, various embodiments of an optical communication cable (e.g., a fiber optic cable, an optical fiber cable, etc.) are shown. In general, the cable embodiments disclosed herein are configured to support a large number of optical fibers within a relatively small space while, at least in some embodiments, providing a high level of fire resistance despite the large number of optic fibers located within the cable. In various embodiments, the cable embodiments disclosed herein include various structures that isolate tension applied to the cable and that provide low latency or skew between different fibers within the cable.

In various embodiments, the cable embodiments disclosed herein include a plurality of optical transmission units and each unit includes at least one optical fiber. In some embodiments, the optical transmission units are optical fiber subunits each having a fire resistant subunit jacket surrounding a plurality of optical fibers (e.g., twelve optical fibers). In some exemplary embodiments, the optical fiber subunits are located in an outer cable jacket and may be stranded within the cable jacket without intermediate jacket layers between the optical fiber subunits and the outer cable jacket. In other embodiments, the optical transmission units are bundles of optical fiber subunits. In such embodiments, the optical fiber subunits are grouped into a plurality of bundles each including a plurality of optical fiber subunits surrounded by a fire resistant bundle jacket. In various embodiments, the bundles are then surrounded by an outer cable layer, e.g., a cable jacket, made from a fire resistant material. In various embodiments, the three tiered layers of fire resistant material provide a cable that passes various fire rating tests (e.g., the plenum burn test, the riser burn test, etc.) despite supporting a large number of fibers (e.g., at least 192, fibers, at least 288 fibers) while at the same time allowing the thickness of the outer cable jacket to be relatively low.

In various embodiments, the optical transmission units are stranded or wrapped within the cable jacket. For example, in various embodiments, either optical fiber subunits or the bundles of optical fiber subunits are stranded or wrapped around each other within the cable jacket. In various embodiments, the cable includes an inner group of optical transmission units (e.g., optical fiber subunits or optical fiber bundles of subunits) that are wrapped or twisted together and an outer group of optical transmission units (e.g., optical fiber subunits or optical fiber bundles of subunits) that are located outside of and are wrapped or twisted around the inner group. In various embodiments, the pitch of the wrapped pattern of each of the wrapped groups of optical transmission units are selected such that the optical fibers of the optical transmission units of the outer group have substantially the same total length as the optical fibers of the optical transmission units of the inner group.

Communications systems may use parallel optics schemes to increase system bandwidth. In such applications, the difference in the time between optical fibers for transmitting a signal from one end of the cable to the other end is called "skew." For at least some parallel optics schemes, low skew is an important property of the cable. Accordingly, in various embodiments of the cable of the present disclosure, the optical fibers within a subunit are substantially the same length as each other such that there is low skew between the optical fibers within a subunit. Furthermore, the subunits are uniformly stranded within each bundle such that the total length of the optical fibers within a bundle are substantially the same as the other fibers within the bundle, which results in low skew between the optical fibers within a bundle.

In addition, in various embodiments, the pitch or "lay length" of the wrapped optical transmission units in the inner group is less than the pitch or "lay length" of the optical transmission units of the outer group (e.g., meaning that the twist of the inner group is tighter than that of the outer group). In embodiments in which the optical transmission units include bundles of optical fiber subunits, the pitch or "lay length" of the wrapped bundles in the inner group is less than the pitch or "lay length" of the wrapped bundles of the outer group (e.g., meaning that the twist of the inner group is tighter than that of the outer group). In embodiments in which the optical transmission units include non-bundled optical fiber subunits, the pitch or "lay length" of the wrapped optical fiber subunits in the inner group is less than the pitch or "lay length" of the wrapped bundles of the outer group (e.g., meaning that the twist of the inner group is tighter than that of the outer group). Thus, in these embodiments, the tighter twist of the inner group accounts for the lower diameter of the inner group relative to the outer group such that the total length of the optical fiber subunits and/or optical fibers within the subunits are substantially the same between the outer group and the inner group. In various embodiments, it is understood that the substantially equal optical fiber length between the inner and outer groups results in an optical fiber cable with low skew between fibers of the inner and outer groups, and in various embodiments, the cable embodiments discussed herein are high density cables for use with equipment that utilize cables with low skew characteristics. Further, the substantially equal length between fibers of the inner and outer groups also helps ensure that the fiber tension that is experienced is substantially evenly distributed across the fibers of the cable.

In addition, various cable embodiments discussed herein include two levels of tensile strength strand or yarn strands (e.g., aramid strands) each having different lengths relative to each other. In various embodiments, the different lengths of tensile strength yarns allow for different tensions to be isolated and transmitted within the cable as may be desired for different applications. For example in various embodiments, the cable embodiments discussed herein include a first set of tensile strength strands located outside of each subunit jacket and a second set of tensile strength strands located within each subunit jacket. In various embodiments, the first set of tensile strength strands are somewhat shorter in length than the optical fibers within the subunits, and the second set of tensile strength strands have substantially the same length as the optical fibers within the subunit. In specific embodiments in which the optical transmission units include bundles of optical fiber subunits, the first set of tensile strength strands may be located within each bundle jacket or within the cable jacket but outside of each subunit jacket and the second set of tensile strength strands are located within each subunit jacket. In specific embodiments in which the optical transmission units include unbundled optical fiber subunits, the first set of tensile strength strands may be located outside of each subunit jacket but within the passage defined by the cable jacket and the second set of tensile strength strands are located within each subunit jacket.

As will be explained in more detail below, a furcation body or plug may be coupled to the cable to split the optical fiber subunits out from the cable body to optical fiber connectors that can then allow the fibers to be connected to various pieces of equipment. In such embodiments, the first set of tensile strength strands may be coupled to the furcation body. Because the tensile strength strands of the first set are shorter than the optical fibers, the first set of tensile strength strands acts to isolate tension within the cable and allows pulling equipment to engage and pull on the furcation body such that the tension caused by pulling is transmitted through the first set of tensile strength strands rather than in the optical fibers.

Further, the second set of tensile strength strands may be coupled to the optical fiber connectors located at the end of each optical fiber subunit split out from the outer cable jacket at the furcation body. Coupling the second set of tensile strength strands (that are the same length as the optical fibers) acts to limit the amount tension on the optical fibers when installing the connectors in equipment racks. Thus, it is believed that the differential length of the two sets of tensile strength strands discussed herein result in a cable and a cable assembly with improved tension distribution characteristics.

Figure 2:
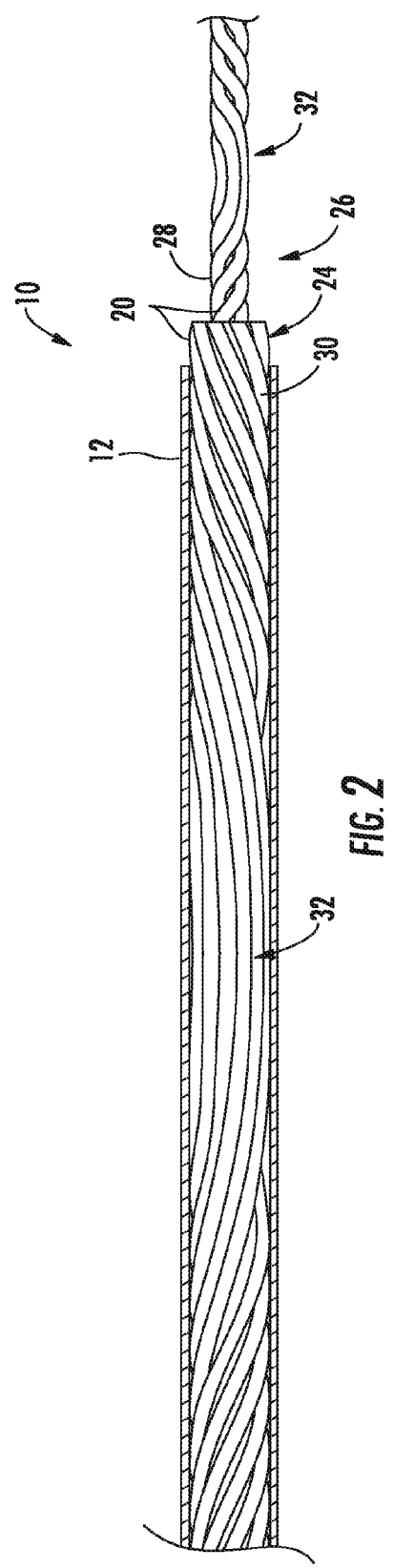
FIG. 2 is a side view of the cable of FIG. 1 with the cable jacket removed showing wrapped bundle groups according to an exemplary embodiment.

Referring to FIGS. 1 and 2, an optical communication cable, shown as cable 10, is shown according to an exemplary embodiment. Cable 10 includes an outer cable layer, shown as a cable body or cable jacket 12, having an inner surface 14 that defines an inner passage or cavity, shown as central bore 16. As will be generally understood, inner surface 14 of jacket 12 defines an internal area or region within which the various cable components discussed below are located.

In various embodiments, cable 10 is a high density optical fiber cable that includes a large number of optical fibers in a cable with a relatively low cross-sectional area. In such embodiments, cable 10 includes a plurality of optical transmission units, shown as optical fiber bundles 20. In general, as explained in more detail below, each bundle 20 includes a plurality of optical fiber subunits, shown as subunits 50, and, in the specific embodiment shown, each bundle 20 includes four subunits 50. Each subunit 50 includes a plurality of individual elongate optical transmission elements, shown as optical fibers 58, and in the specific embodiment shown, each subunit 50 includes 12 individual optical fibers 58.

As shown in FIG. 1 and FIG. 2, cable 10 includes an outer group 24 of bundles 20 and an inner group 26 of bundles 20. In general, inner group 26 is located generally in the central region of bore 16, and outer group 24 is located around and surrounding inner group 26. In the specific embodiment shown, cable 10 includes three bundles 20 within inner group 26 and nine bundles 20 within outer group 24. In other embodiments, inner group 26 may include two, four, five, etc. bundles 20 and outer group 24 may include less than nine bundles 20 or more than nine bundles 20. While the embodiments discussed herein relate primarily to a cable having two groups (an inner group and an outer group) of bundles 20, in other embodiments, cable 10 may include three, four, five or more concentric groups of bundles 20.

As shown best in FIG. 2, in various embodiments, both inner group 26 and outer group 24 of optical fiber bundles 20 are wrapped, twisted or stranded to form a wrapped pattern within bore 16. As shown in FIG. 2, bundles 20 of inner group 26 are wrapped around each other forming a first wrapped pattern, and bundles 20 of outer group 24 are wrapped around inner group 26 forming a second wrapped pattern. In various embodiments, the first wrapped pattern and second wrapped pattern each include at least one spirally wrapped or twisted portion. In various embodiments, the first wrapped pattern of inner group 26 is different from the second wrapped pattern of outer group 24. In general, the wrapped patterns of inner group 26 and outer group 24 are selected such that the lengths of the bundles 20 (and consequently of the optical fibers within each bundle 20) are substantially the same as the other bundles 20 and other fibers of cable 10 (e.g., lengths of all bundles and all fibers of cable 10 are within 1.5% of each other and more specifically within 0.1% of each other, as discussed in more detail below).

In general, the equal lengths between the inner group 26 and outer group 24 are achieved through the inner group 26 having a tighter spiral pattern than outer group 24, and thus the tighter wrapped pattern of inner group 26 accounts for the smaller diameter of group 26 as compared to outer group 24 resulting in the substantially same lengths of bundles 20 and fibers between inner group 26 and outer group 24. In a specific embodiment, the wrapped patterns of inner group 26 and outer group 24 are selected such that the lengths of the bundles 20 of each group are substantially the same as the other bundles 20 within at least one, 1 meter section of cable 10.

In various embodiments, the differential wrapping between inner group 26 and outer group 24 provide for a cable 10 that allows for a high fiber density cable with characteristics suitable for use in indoor data center applications. The substantially equal length of bundles 20 (and of optical fibers within the bundles) between inner group 26 and outer group 24 results in a cable 10 with relatively low skew between the fibers of different bundles 20. This may facilitate usage of cable 10 in conjunction with certain data center communications equipment, for example parallel optics transmission equipment. In various embodiments, this stranding arrangement results in a cable 10 that has relatively low skew meaning that the difference in transit time for optical communication signals traveling in the optical fibers of outer group 24 versus the transmit time for optical communication signals traveling in the optical fibers of inner group 26 is less than 20 picoseconds/meter of cable (ps/m) and more specifically is less than 10 ps/m. In addition, the substantially equal length of bundles 20 (and of optical fibers within the bundles) between inner group 26 and outer group 24 results substantially even tension distribution between the optical fibers of outer group 24 and inner group 26.

As noted above and shown in FIG. 2, inner group 26 includes at least one spiral wrapped section 28, and outer group 24 includes at least one spiral wrapped section 30. Each spirally wrapped section includes a pitch length (also known as lay length) which is the axial distance required for one of the bundles 20 to complete a full revolution within the spiral pattern. In some embodiments, inner group 26 and outer group 24 has an average pitch length (or average lay length) which is the average of the multiple individual pitch lengths along the length of cable 10.

In various embodiments, the pitch length of at least one spiral wrapped section of inner group 26 is between 125 mm and 350 mm, specifically is between 150 mm and 250 mm, and more specifically is between 175 mm and 225 mm. In such embodiments, the pitch length of at least one spiral wrapped section of outer group 24 is between 300 mm and 900 mm, specifically is between 400 mm and 600 mm, and more specifically is between 450 mm and 550 mm. In a specific embodiment, the pitch length of at least one spiral wrapped section of inner group 26 is between 175 mm and 225 mm and the pitch length of at least one spiral wrapped section of outer group 24 is between 450 mm and 550 mm. In another specific embodiment, the pitch length of at least one spiral wrapped section of inner group 26 is between 195 mm and 205 mm and the pitch length of at least one spiral wrapped section of outer group 24 is between 505 mm and 515 mm.

In various embodiments, the differential stranding or wrapping of inner group 26 and outer group 24 results in a relatively low length difference (e.g., excess bundle length) between outer group 24 and inner group 26 such that the lengths of bundles 20 are substantially the same between outer group 24 and inner group 26. In various embodiments, the percentage length difference between the bundles 20 of outer group 24 and the respective optical fibers of outer group 24 and the bundles 20 of inner group 26 and the respective optical fibers of inner group 26 is less than 0.6%, specifically is less than 0.3% and more specifically is between 0.05% and 0.15%.

Various specific embodiments of a cable 10 having differential spiral wrapping between inner group 26 and outer group 24 are shown in the Table 1 below for a bundles with a diameter of 5.6 mm Similar tables may be constructed for bundles having different diameters.

TABLE 1

| Average Pitch or Lay Length | | Difference in Length of |
|---|---|---|
| Inner Group 26 (mm) | Outer Group 24 (mm) | Bundles Compared to Length Cable 10 (%) |
| 350 | 891 | 0.18 |
| 300 | 764 | 0.24 |
| 250 | 636 | 0.34 |
| 200 | 509 | 0.54 |
| 175 | 445 | 0.70 |
| 150 | 382 | 0.95 |
| 138 | 350 | 1.13 |
| 125 | 318 | 1.37 |

Table 1 shows the differences between the cable length and bundle length for exemplary embodiments of cable 10 having bundles with a diameter of 5.6 mm. Typical stranding for cables of this size would be to use a 350 mm lay length for both layers of the cable. For such stranding parameters, the inner layer 26 would be 0.18% longer than the cable, and the outer layer would be 1.13% longer than the cable. Such stranding would result in the optical fibers in the outer layer being 0.95% longer than the optical fibers in the inner layer (that is 1.13%−0.18%=0.95%). Because the lay lengths of the inner group and outer group of bundles 20 of cable 10 are different, as discussed above, the fiber length between the outer bundle 24 and the inner bundle 26 is balanced. For example, if the outer bundle 24 has a lay length of 350 mm, then the inner bundle 26 would have a lay length of 138 mm to balance the optical fiber lengths. In general, long lay lengths make the cable less flexible and short lay lengths reduce production speed. Table 1 shows a range of paired lay lengths from which to choose to obtain desired cable properties.

A number of different wrapped patterns may be used to form outer layer 24 and inner layer 26. In various embodiments, outer layer 24 and inner layer 26 are wrapped in an SZ wrapped pattern (also referred to as an SZ stranding pattern). In such embodiments, outer layer 24 and inner layer 26 include right-handed spirally wrapped sections, reversal sections and left-handed spirally sections. Within right-handed spirally wrapped sections, bundles 20 are wrapped spirally in the right-handed direction. Within left-handed spirally wrapped sections, bundles 20 are wrapped spirally in the left-handed direction. Reversal sections 32 are the sections that provide the transition between the right-handed spirally wrapped sections and the left-handed spirally wrapped sections. In some embodiments, as shown in FIG. 2, the reversal sections 32 are shaped as a sinusoidal function. In various embodiments, the at least one spirally wrapped section of the wrapped pattern of inner group 26 and outer group 24 may be either the left-handed or right-handed spirally wrapped sections of the SZ stranding pattern shown, and may have any of the pitch lengths discussed herein.

It should be understood that while FIG. 2 shows one right-handed spirally wrapped section, one reversal section and one left-handed spirally wrapped section, inner group 26 and outer group 24 may include a large number of repeating sections similar to the sections shown in FIG. 2. In various embodiments, the right-handed spirally wrapped sections and left-handed spirally wrapped sections alternate along the length of cable with reversal sections located between each oppositely wrapped spiral section. In other embodiments, inner group 26 and outer group 24 may be wrapped in non-reversing spiral or helical patterns having any of the pitch lengths discussed herein.

Figure 3:
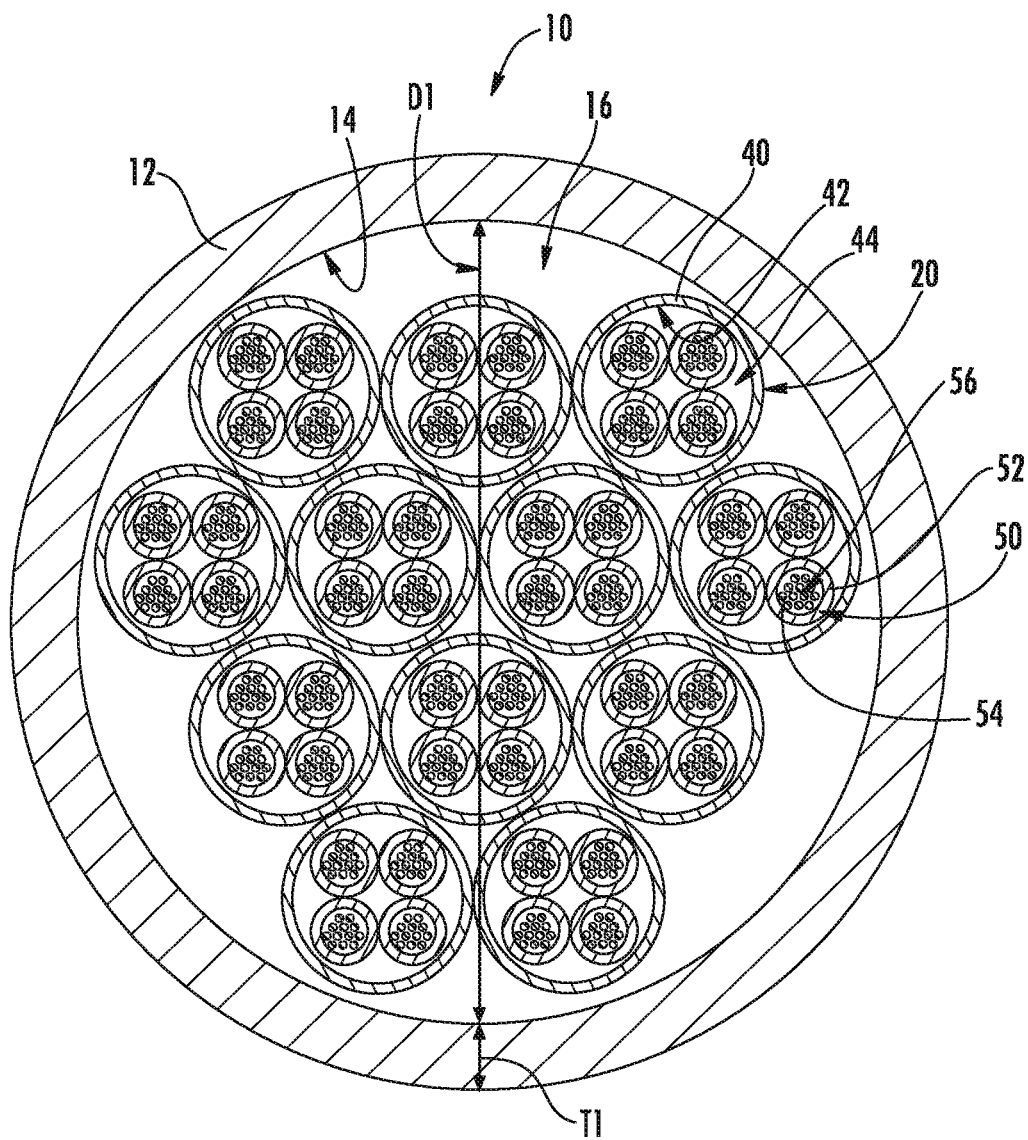
FIG. 3 is a cross-sectional view of the cable of FIG. 1 according to an exemplary embodiment.
Figure 4:
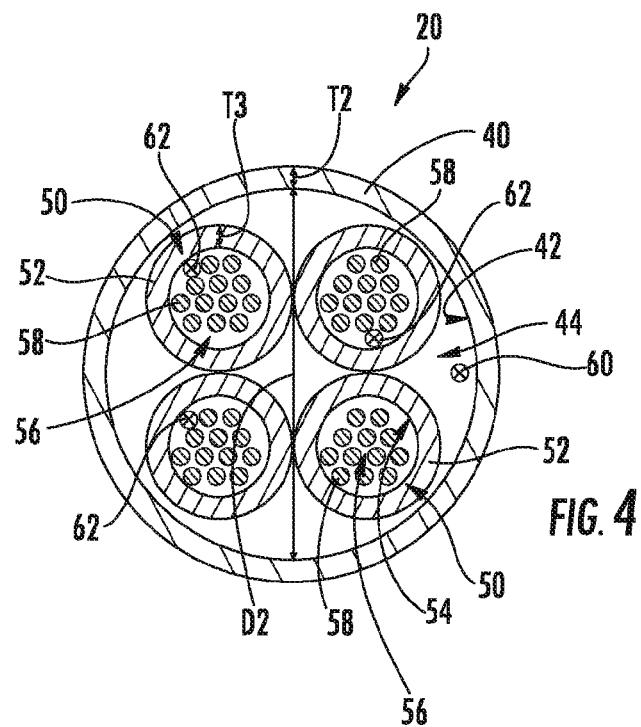
FIG. 4 is a cross-sectional view of a bundle of the cable of FIG. 1 according to an exemplary embodiment.

Referring to FIG. 3 and FIG. 4, the structure of cable 10 is shown in more detail. As shown in FIG. 3, cable 10 includes a plurality of bundles 20 (e.g., twelve bundles 20 in the specific embodiment shown) located within bore 16 defined by cable jacket 12. Each bundle 20 includes an outer layer or bundle jacket 40 that has an inner surface 42 that defines a bundle passage or bore 44. Each bundle 20 includes at least one or a plurality of optical fiber subunits, shown as subunits 50, located within bundle passage 44. Each subunit 50 includes an inner jacket or subunit jacket, shown as subunit sheath 52, having an inner surface 54 defining a subunit passage or bore 56. A plurality of individual, elongate optical transmission elements, shown as optical fibers 58 are located within bore 56 of each subunit 50.

In various embodiments, cable jacket 12, bundle jacket 40 and subunit sheath 52 are each formed from an extrudable or extruded polymer material of sufficient strength to hold together each unit of cable 10 as discussed herein. In various embodiments, cable jacket 12 provides for structure and support for cable 10, and bundle jacket 40 may be thin enough to allow for access to subunits 50 without the need for cutting tools. In various embodiments, cable jacket 12 may include an access feature, such as one or more frangible sections or ripcords, that allows a user to open cable jacket 12 with relative ease in order to access bundles 20 and subunits 50. In accordance with yet other aspects of the disclosure, the bundle jacket 40 may be made from a low strength material with a thin wall such that one may remove the bundle jacket by simply tearing it with the fingers. In various embodiments, bundle jacket 40 and/or subunit sheath 52 may be formed from a helically wrapped binder yarn. In various embodiments, subunit 50 may contain water swellable powders, threads or tapes to impart water blocking capability to the subunit.

In various embodiments, the function of the bundle jacket is to hold the subunits within the bundle together so they form a cohesive unit that might pass through processing equipment to be placed within the cable cavity 16. In various embodiments, this function may also be fulfilled by helically stranding the subunits with a tight twist (e.g. like a rope) so that they form a cohesive unit or bundle for processing.

In various embodiments, bundle jacket 40 may be an extruded thin film that cools to provide an inwardly directed force on to subunits 50. The inwardly directed force provided by this embodiment of bundle jacket 40 assists to hold subunits 50 together. For example, the inwardly directed force provided by bundle jacket 40 may act to prevent/resist unraveling of the wound subunits 50.

As discussed above, bundles 20 are wrapped or stranded within bore 16 of cable jacket 12. In addition to the bundle level stranding, subunits 50 are wrapped or stranded around each other within each bundle 20. In such embodiments, subunits 50 are wrapped to include at least one spirally wrapped section, and specifically may be SZ stranded as discussed above regarding stranding of bundles 20. In various embodiments, subunits 50 may be wrapped in a pattern such that the pitch length of the wrapped subunits 50 is between 85 mm and 1000 mm, specifically between 200 mm and 400 mm. In various embodiments, the tensile strands 60 within each bundle 20 are substantially parallel to the axis of the bundle or are introduced into the bundle without wrapping or stranding thereby making the tensile strands within the bundle shorter than the subunits and optical fibers. In various embodiments the bundles may contain water swellable powders, threads, or tapes to impart water blocking capability to the bundles.

In various embodiments, the two stranding levels of cable 10 results in a cable in which the total axial length of subunits 50 is greater than the total axial length of the surrounding bundle 20 (and specifically of the bundle jacket 40), and the total axial length of bundles 20 is greater than the total axial length of cable 10 (and specifically cable jacket 12). In addition, in such embodiments, optical fibers 58 are not stranded within subunit sheath 52, and in such embodiments, the total axial length of optical fibers 58 is substantially the same (e.g., within less than 0.1% of each other) as the axial length of the respective subunit 50 (and specifically subunit sheath 52).

In various embodiments, cable 10 is fire resistant cable suitable for indoor use. In various embodiments, cable 10 includes materials and is designed to pass the plenum burn test (NFPA 262) and/or the riser burn test (UL1666). In another embodiment, cable 10 is a fire-resistant, non-corrosive cable (IEC 60332 3). In another embodiment, the optical communication cable achieves at least a Class Dca rating with the European construction products regulation for fire safety when tested to EN50339, EN61034-2, EN60754-2, and EN60332-1-2-3 and achieved a Class Dca rating, or more preferably a Class Cca rating, or more preferably a class B2ca rating as described in the standards. In various embodiments, optical fibers 58 include an outer protective coating, such as a UV-cured urethane acrylate materials, that act to protect the inner glass fiber. However, these outer coating materials may generate significant heat when exposed to fire such that as the optical fiber count and optical fiber density of a particular cable increase, the burn resistance of the cable 10 tends to decrease. However, in various embodiments, cable 10 is specifically structured to provide a high fiber count, high fiber density cable while still maintaining satisfactory burn resistance characteristics.

In such fire resistant embodiments of cable 10, cable jacket 12, bundle jacket 40 and subunit sheath 52 are all formed from a fire resistant material, such as an extrudable fire resistant polymer material. In various embodiments, by utilizing multiple layers of fire resistant jacket materials within cable 10, cable 10 is able to pass the various fire resistance tests discussed above despite the large number of fibers and high fiber density of cable 10. In addition, by utilizing multiple layers of fire resistant jacket materials within cable 10, the overall cross-sectional area, outer diameter of cable 10 and the thickness of cable jacket 12 are reduced as compared to other high number fiber cables without the multi-layer fire resistant design of cable 10.

In various embodiments, cable jacket 12, bundle jacket 40 and subunit sheath 52 are formed from an extrudable polymer material that includes one or more material, additive or component embedded in the polymer material that provides fire resistant characteristics such as relatively low heat generation, low heat propagation, low flame propagation, low smoke production. In various embodiments, the fire resistant material may include an intumescent material additive embedded in the polymer material. In other embodiments, the fire resistant material includes a non-intumescent fire resistant material embedded in the polymer material, such as a metal hydroxide, aluminum hydroxide, magnesium hydroxide, etc., that produces water in the presence of heat/fire which slows or limits heat transfer through cable 10. In specific embodiments, the fire resistant material may be a low smoke zero halogen polymer material.

In various embodiments, cable jacket 12, bundle jacket 40 and subunit sheath 52 may include particles of intumescent material embedded in the material of the cable jacket forming an intumescent layer that coats the inner surface of the respective jacket. In this embodiment, as heat is transferred through each jacket layer, the intumescent material expands blocking air flow through the bore of the respective jacket layer. The intumescent material also forms a char layer that has low heat conductivity further limiting heat penetration into the middle of the cable. In various embodiments, the intumescent material may include sodium silicates, graphite or one or more of the Exolit materials available from Clariant. In various embodiments, the fire resistant material may be a fire resistant polyethylene, polypropylene, PVC, or any suitable fire resistant polymer material used in optical fiber cable construction.

In various embodiments, cable jacket 12, bundle jacket 40 and subunit sheath 52 may each be formed from the same fire resistant material, and in other embodiments, cable jacket 12, bundle jacket 40 and subunit sheath 52 may each be formed from different fire resistant materials as each other. In various embodiments, at least one of cable jacket 12, bundle jacket 40 and subunit sheath 52 may be formed from a fire resistant material and at least one of cable jacket 12, bundle jacket 40 and subunit sheath 52 may be formed from a non-fire resistant material. In various embodiments, water swellable powders, tapes, or yarns may be placed within jacket 12 to impart water blocking capability to the cable.

In certain embodiments, the fire resistant material of cable jacket 12, bundle jacket 40 and subunit sheath 52 may be a highly-filled polymer material with a limiting oxygen index (LOI) of 54 or higher. However in other embodiments, cable jacket 12, bundle jacket 40 and subunit sheath 52 may be formed from a less highly-filled jacket material with an LOI of 48 or less and may utilize embedded intumescent materials, fire retardant tapes, etc. to provide the desired fire resistant properties. In such embodiments, cable 10 may include a fire retardant tape, such as mica tape, wrapped around and outside of bundles 20.

In various embodiments, cable jacket 12 has a thickness shown as T1, bundle jacket 40 has a thickness shown as T2 and subunit sheath 52 has a thickness shown as T3. In various embodiments, T1 is between 0.1 mm and 3 mm, specifically is between 0.5 mm and 1.5 mm and more specifically is about 1.0 mm (1.0 mm plus or minus 0.1 mm). In various embodiments, T2 is between 0.1 mm and 0.8 mm, specifically is between 0.2 mm and 0.6 mm and more specifically is about 0.4 mm. In various embodiments, T3 is between 0.1 mm and 1.0 mm, specifically is between 0.2 mm and 0.6 mm and more specifically is about 0.3 mm. In various embodiments, by utilizing the three distinct fire resistant layers, the total thickness of cable jacket 12 may be smaller than is typically needed to pass one or more of the burn tests discussed above with a cable having a high number of optical fibers that relies only on outer layers for fire resistance.

In the embodiment shown, cable 10 is configured to hold 576 total optical fibers 58. In such embodiments, cable 10 includes twelve bundles 20, and each bundle 20 includes four subunits 50 such that cable 10 includes 48 total subunits 50. In such embodiments, each subunit 50 includes twelve optical fibers 58. In this embodiment, each bundle 20 is configured to be coupled to a 48 fiber connector at the upstream end of cable 10, and each subunit 50 is configured to be coupled to a 12 fiber connector (e.g., connector 76 discussed below) at the downstream end of cable 10.

In other embodiments, cable 10 may support various numbers of bundles 20 each including various numbers of subunits 50 each including various numbers of optical fibers 58. In various embodiments, cable 10 may include 6, 8, 10, 14, 16, 20, etc. bundles 20, and each bundle 20 may include 2, 3, 5, 6, 8, 10 etc. subunits 50, and each subunit 50 may include 2, 4, 6, 8, 10, 14, 16, 20, 28, 32, etc. optical fibers 58. In one embodiment, each bundle 20 includes two, twelve optical fiber subunits, and the upstream end of cable 10 is configured to be coupled to a 24 fiber connector. In another embodiment, each bundle 20 includes three, twelve optical fiber subunits, and the upstream end of cable 10 is configured to be coupled to a 36 fiber connector. In another embodiment, each bundle 20 includes six, twelve optical fiber subunits, and the upstream end of cable 10 is configured to be coupled to a 76 fiber connector. In another embodiment, each bundle 20 includes eight, twelve optical fiber subunits, and the upstream end of cable 10 is configured to be coupled to a 96 fiber connector.

In various embodiments, the maximum outer dimension of cable jacket 12, shown as the outer diameter, D1, of cable jacket 12 is smaller than is typically needed to provide a cable with this large number of optical fibers and providing satisfactory fire resistant characteristics. In various embodiments, D1 is less than 30 mm, specifically is less than 28 mm and more specifically is less than 26 mm. In various embodiments, cable 10 includes at least 288 optical fibers 58 and the outer diameter of cable jacket 12 is less than 30 mm, and in another embodiment, cable 10 includes at least 500 optical fibers 58 and the outer diameter of cable jacket 12 is less than 30 mm. In a specific embodiment, cable 10 includes 576 optical fibers 58 and the outer diameter of cable jacket 12 is less than 30 mm. In various embodiments, bundles 20 each have an outer diameter shown as D2, and in various embodiments, D2 is between 4 mm and 7 mm, specifically is between 5 mm and 6 mm and more specifically is about 5.6 mm (e.g., 5.6 mm plus or minus 0.2 mm).

In addition to providing a high fiber count in a relatively compact, fire resistant cable, cable 10 may also be structured to provide for tension isolation allowing cable 10 to be used in conjunction with furcation structures and optical fiber connectors that may facilitate use of cable 10 within a datacenter. In general cable 10 includes at least two distinct groups of tensile strength strands or yarns within cable 10. As shown best in FIG. 4, cable 10 includes at least one first tensile strength strand, shown as bundle yarn 60, in each bundle 20, and at least one second tensile strength strand, shown as subunit yarn 62, located in each subunit 50. In various embodiments, tensile strands or rigid rods may be added within bore 16 but outside of bundles 20.

Bundle yarn 60 is located inside of bundle jacket 40 but outside of subunit sheaths 52, and subunit yarn 62 is located inside of subunit sheath 52. It should be understood that while FIG. 4 shows one bundle yarn 60 located within each bundle 20 and one subunit yarn 62 located in each subunit 50, more than one bundle yarn 60 may be located in each bundle 20 and more than one subunit yarn 62 may be located in each subunit 50. In various embodiments, use of bundle yarn 60 and/or subunit yarn 62 allows cable 10 to be formed without a central strength member, such as a glass-reinforced plastic (GRP) rod, present in the center of many optical fiber cables.

In various embodiments, bundle yarn 60 is unstranded (e.g., is not wrapped around the outside of subunits 50) within each bundle 20 such that bundle yarn 60 is substantially the same length as bundle 20 and specifically bundle jacket 40. As will be understood, in this arrangement, because bundles 20 are stranded in a wrapped pattern and because subunits 50 are stranded in a wrapped pattern within each bundle 20, the total axial length of bundle yarn 60 is less than the total axial length of subunits 50 and is less than the total axial length of optical fibers 58 within each subunit. In various embodiments, the total axial length of bundle yarn 60 is between 0.05% and 0.4% and more specifically between 0.1% and 0.2% less than the total axial length of subunits 50 and the total axial length of optical fibers 58 within each subunit. As explained in more detail below, this arrangement results in a cable in which tension applied to the cable is primarily transmitted by and experienced by bundle yarn 60 rather than optical fibers 58.

As shown in FIGS. 3 and 4, cables may be formed with nine bundles stranded around three bundles. In order to produce cables of various fiber counts and maintain the 9-over-3 stranding, the bundles 20 may have either three or four or more subunits 50 within a bundle. Some cable designs incorporate fiber counts that do not lend themselves to twelve uniformly sized bundles. For these cables, filler rods may be used to replace some of the subunits 50. For example, to achieve a cable with 384 fibers, then the cable shown in FIG. 4 could be made with four of the subunits 50 replaced by filler rods. The filler rods may be either solid rods of the appropriate fire retardant material or simply a subunit that contains no optical fibers.

In various embodiments, subunit yarn 62 is unstranded (e.g., is not wrapped around the outside of optical fibers 58) within each subunit 50 such that subunit yarn 62 is substantially the same length as each subunit 50 and specifically subunits sheath 52. As will be understood, in this arrangement, because optical fibers 58 are similarly unstranded within subunit 50, the total axial length of subunit yarn 62 within each subunit 50 is substantially the same as the total axial length of optical fibers 58 within each subunit. In such embodiments, the total axial length of subunit yarn 62 is within 0.1% and more specifically within 0.05% of the total axial length of optical fibers 58. As explained in more detail below, this arrangement results in a cable in which tension applied to the cable is isolated upstream from a furcation body and evenly distributes tension experienced by the optical connectors coupled to the subunits.

In various embodiments, bundle yarn 60 and subunit yarn 62 may be any suitable tensile strength yarn or fiber material used in cable construction. In various embodiments, bundle yarn 60 and subunit yarn 62 are formed from an aramid yarn material. In other embodiments, the tensile strength strands of cable 10 may be fiberglass yarn, poly(p-phenylene-2,6-benzobisoxazole) yarn sold under the trade Zylon, polyester-polyarylate liquid crystal polymer fiber sold under the trade name Vectran, or other high strength tensile yarns.

Figure 5:
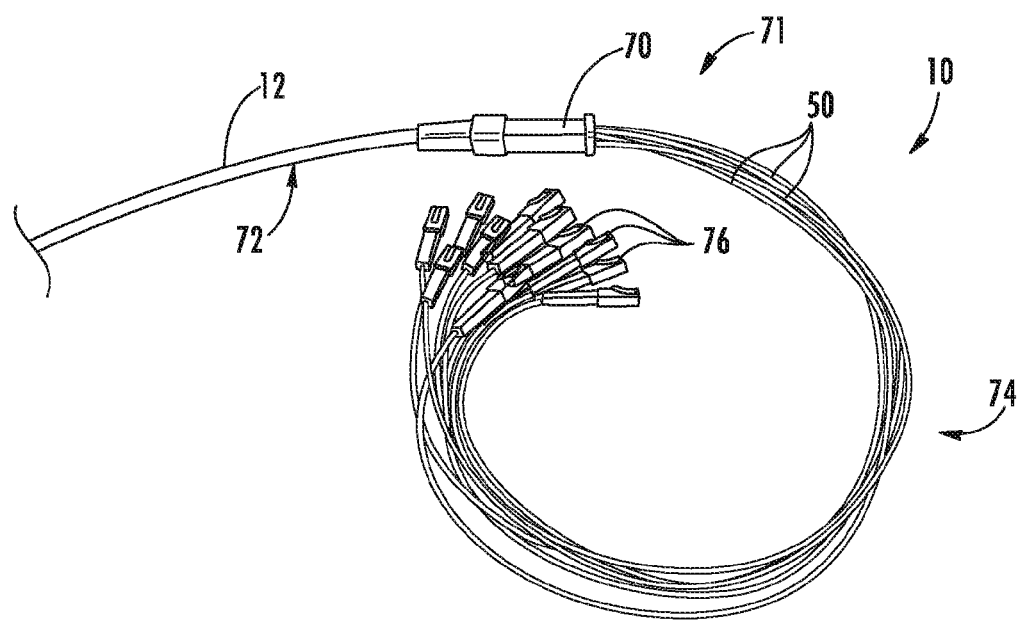
FIG. 5 is a perspective view of the cable of FIG. 1 following furcation and connectorization according to an exemplary embodiment.

FIG. 5 shows a cable assembly 71 formed with cable 10 after access of subunits 50 prior to connection to datacenter equipment. As shown to access subunits 50, a furcation body or plug 70 is coupled to cable 10. In general, furcation plug 70 is mounted to cable 10 allowing optical fibers or in the case of cable 10, subunits 50, to be accessed for connectorization and coupling to equipment. Cable 10 is received into furcation plug 70, and furcation plug 70 is coupled to cable 10.

To couple furcation plug 70 to cable 10, a portion of cable jacket 12 is removed exposing subunits 50. In this arrangement, on the upstream side 72 of furcation plug 70, cable 10 is intact such that the outer surface of jacket 12 defines the outer surface of cable 10 on upstream side 72. On the downstream side 74 of furcation plug 70, cable jacket 12 and bundle jackets 40 have been removed exposing each subunit 50. In this arrangement, the outer surfaces of subunit sheaths 52 define the outer surfaces of cable 10 on the downstream side of furcation plug 70.

Fiber optic connectors 76 are coupled to the downstream ends of subunits 50. In general, each fiber optic connector 76 is coupled to each optical fiber 58 of the subunit 50 to which it is attached, and connector 76 facilitates connection of optical fibers 58 to the various datacenter equipment that cable 10 services. Accordingly, in the embodiment shown, connector 76 is a 12 fiber connector configured to communicate signals from each of the twelve optical fibers of the respective subunit 50.

In such embodiments, separate furcation legs do not need to be installed to support optical fibers 58 because subunit sheaths 52 are sufficiently robust to provide for protection of optical fibers 58 following removal of cable jacket 12 and bundle jacket 40. In addition, subunit sheaths 52 are sufficiently robust to support coupling of connectors 76.

As noted above, the length of bundle yarn strands 60 relative to the length of optical fibers 58 acts such that bundle yarn strands 60 bear tensile forces rather than optical fibers 58. Specifically, in various embodiments, when furcation plug 70 is installed onto cable 10, bundle yarn strands 60 are coupled or locked onto furcation plug 70. In various embodiments, an adhesive material such as epoxy is used to bond bundle yarn strands 60 to furcation plug 70. Thus, in this arrangement, tension that is applied to furcation plug 70 (e.g., via cable pulling equipment such as a pulling grip) is borne through bundle yarn strands 60 rather than through optical fibers 58, and in addition, this arrangement acts to isolate tension within cable 10 to the upstream side 72 of plug 70. This isolation of tension limits the effects of cable tension on the exposed subunits 50 on the downstream side 74 of cable 10.

Further, the length of subunit yarn strands 62 relative to the length of subunits 50 acts to evenly distribute tension within the subunits 50 and the tension experienced by connectors 76. In various embodiments, when connectors 76 are installed on to subunits 50, subunit yarn strand 62 of each subunits coupled to or locked onto connector 76. In various embodiments, subunit yarn strands 62 are held on to the back of connectors 76 with a crimp band. Coupling of subunit yarn strands 62 to connectors 76 limits the transfer of forces from optical fibers 58 to connector 76 and thereby provides strain relief to connector 76.

In another embodiment, cable 10 may include additional tensile strength yarns similar to bundle yarn 60 discussed above, except that the additional yarns are located outside of bundle jackets 40 but inside of cable jacket 12. In such embodiments, the additional tensile strength yarns may be coupled directly to furcation plug 70, which in turn allows bundles 20 to act as the furcation leg of cable 10 (instead of subunits 50). In such embodiments, downstream connectors 76 may then be coupled directly to each bundle 20, and may be larger fiber connectors such as 24, 36, 48, 72, 96 fiber connectors. In another embodiment, cable 10 may include one or more GRP rods that are coupled to the furcation plug 70.

Figure 6:
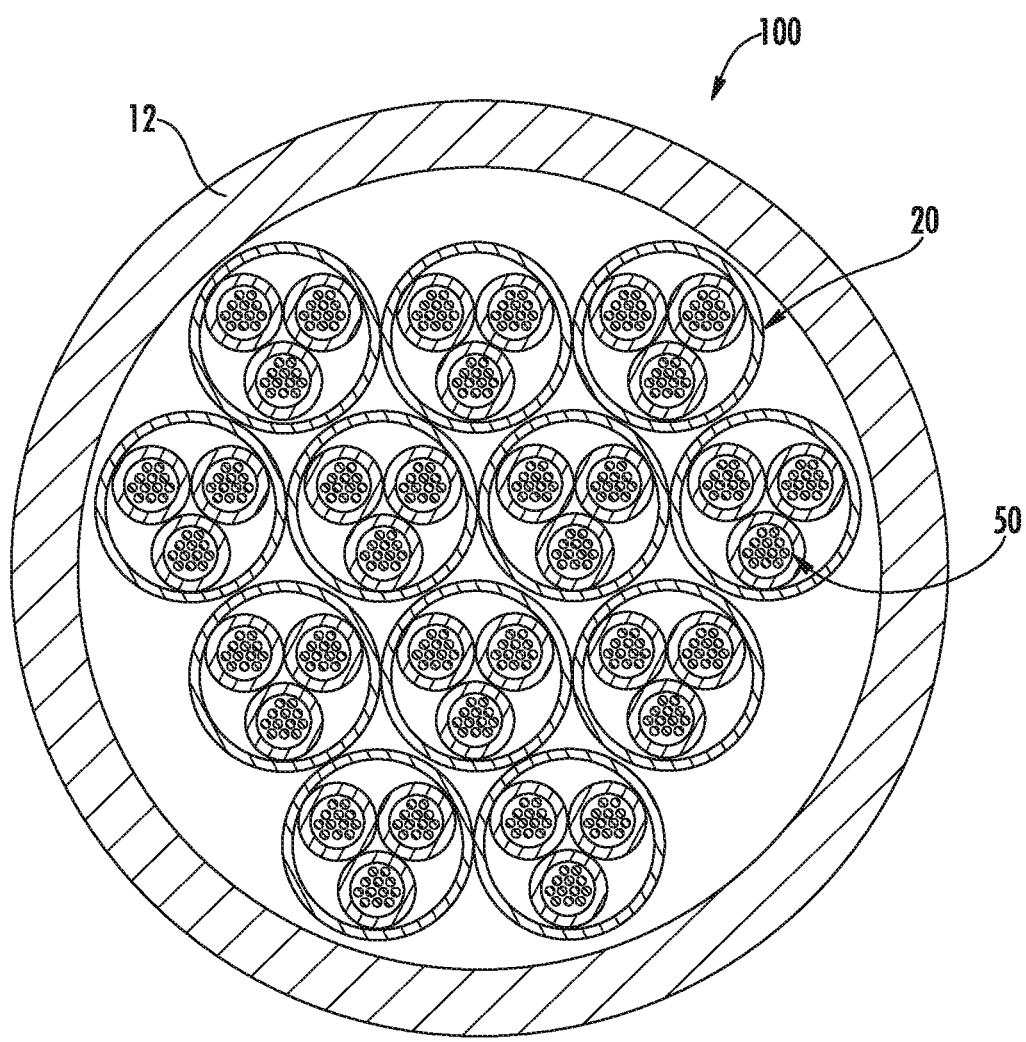
FIG. 6 is a cross-sectional view of a cable according to another exemplary embodiment.

Referring to FIG. 6, an optical fiber cable 100 is shown according to an exemplary embodiment. Cable 100 is substantially the same as cable 10 except as discussed herein. Cable 100 is a 432 fiber cable that includes twelve bundles 20 that each contain three subunits 50 each containing twelve optical fibers 58.

Figure 7:
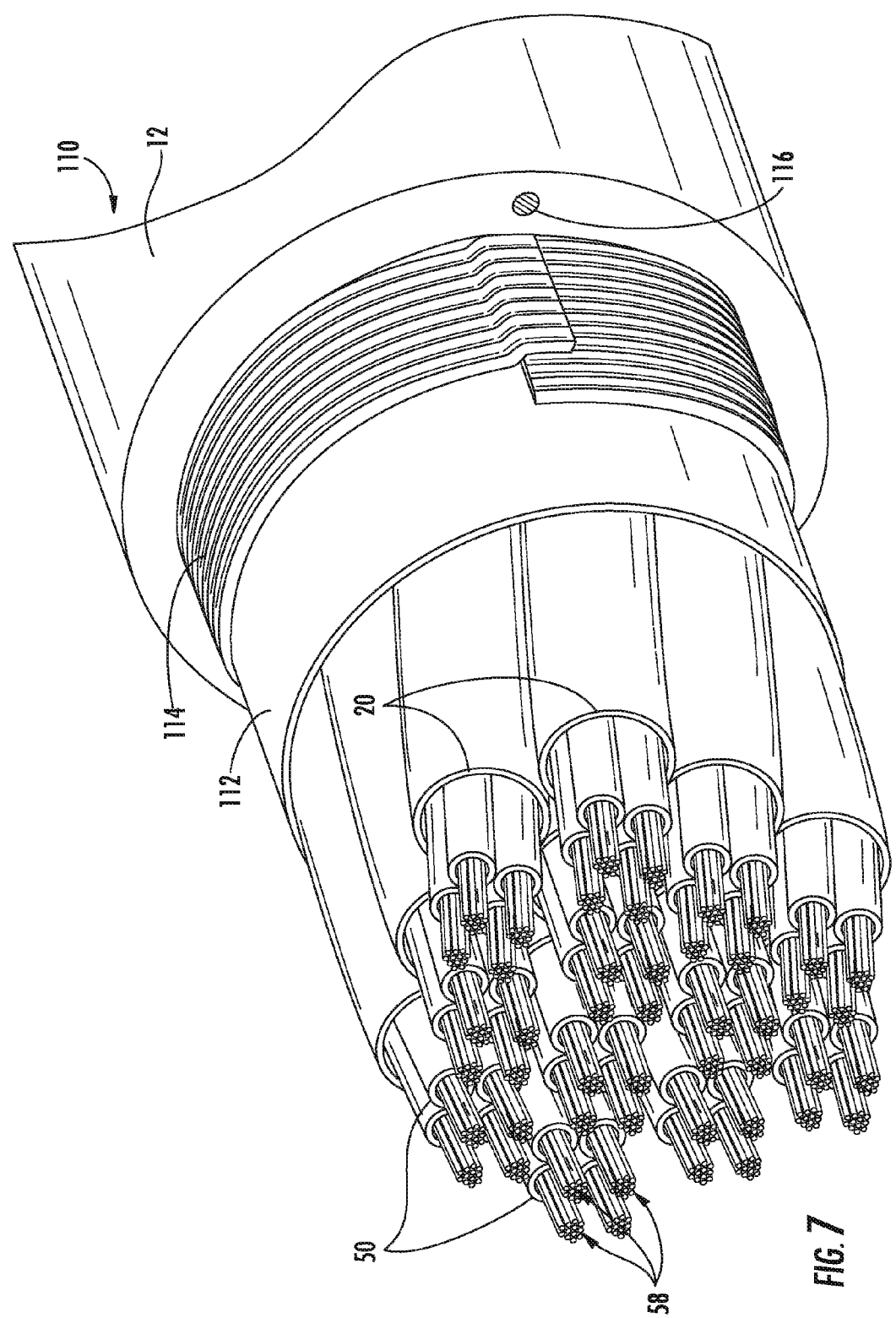
FIG. 7 is a perspective view of an optical fiber cable according to another exemplary embodiment.

Referring to FIG. 7, an optical fiber cable 110 is shown according to an exemplary embodiment. Cable 110 is substantially the same as cable 10 except as discussed herein. Cable 110 is shown as an outdoor or indoor/outdoor cable including the bundle arrangement and tensile yarn arrangements discussed herein. Cable 110 includes a water blocking layer, shown as water blocking tape 112, that surrounds bundles 20. In various embodiments, the water blocking layer may be a water blocking foam, gel, woven or nonwoven material. Cable 110 also includes a reinforcement sheet or layer, shown as armor layer 114, that is located outside of water blocking tape 112. Armor layer 114 is wrapped around the interior elements (including bundles 20) of cable 110 such that armor layer 114 surrounds optical fibers 58. Armor layer 114 generally provides an additional layer of protection to optical fibers 58 within cable 110, and may provide resistance against damage (e.g., damage caused by contact or compression during installation, damage from the elements, or damage from rodents, etc.).

In various embodiments, armor layer 114 is formed from a corrugated sheet of metal material having an alternating series of ridges and troughs. In one embodiment, the corrugated metal is steel. In other embodiments, other non-metallic strengthening materials may be used. For example, armor layer 114 may be formed from fiberglass yarns (e.g., coated fiberglass yarns, rovings, etc.). In some embodiments, armor layer 114 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.). In various embodiments, in addition to water blocking tape 112, a layer of powder, such as water absorbing powder or particles, such as super absorbent polymer (SAP), SAP yarns or a water swellable gel or liquid, is located within bore 16 of cable 110.

Cable 110 may also include one or more access features 116 embedded in the material of cable jacket 12. In general, access features 116 are elongate members or structures embedded within the material of cable jacket 12. In one embodiment, access feature 116 is a discontinuous polymer feature coextruded with the material of cable jacket 12. In this embodiment, access feature 116 is formed from a polymer material that is different from the material of jacket 12, and the difference in materials provides a discontinuity or weakness within cable jacket 12 at the location of access features 116. In another embodiment, access feature 116 is a ripcord or wire embedded in cable jacket 12 that facilitates opening of cable jacket 12.

Figure 8:
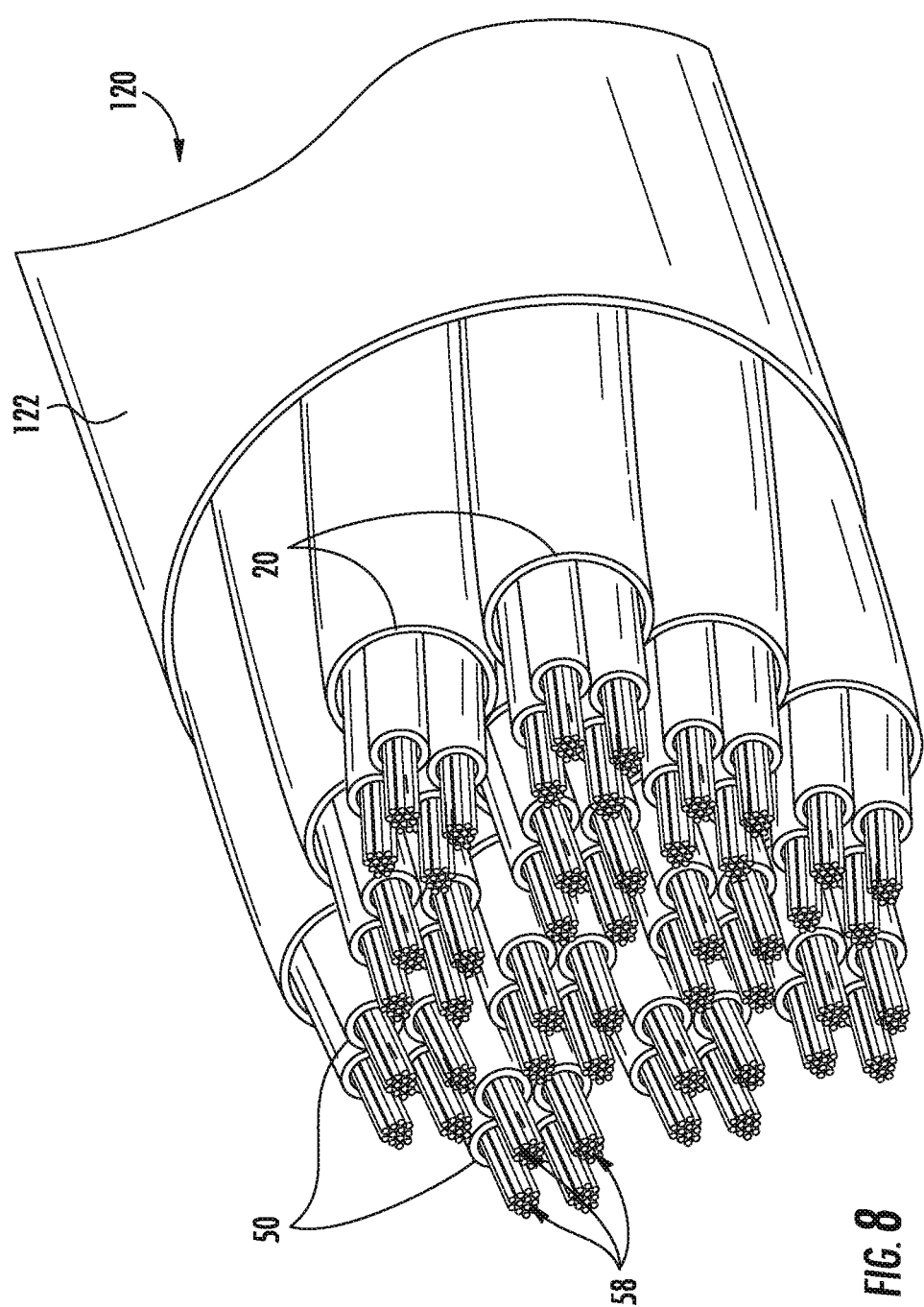
FIG. 8 is a perspective view of an optical fiber cable according to another exemplary embodiment.

Referring to FIG. 8, an optical fiber cable 120 is shown according to an exemplary embodiment. Cable 120 is substantially the same as cable 10 except as discussed herein. In this embodiment, cable 120 includes an outer cable layer, shown as binder 122. In one embodiment, binder 122 is an extruded thin film material that cools and provides an inwardly directed force onto bundles 20 assisting in holding bundles 20 together in the wrapped pattern shown. In other embodiments, binder 122 may be a layer of helically wound binder yarn, binder thread or binder tape. In this embodiment, cable 120 does not include a thicker outer cable jacket, such as cable jacket 12, discussed above.

Figure 9:
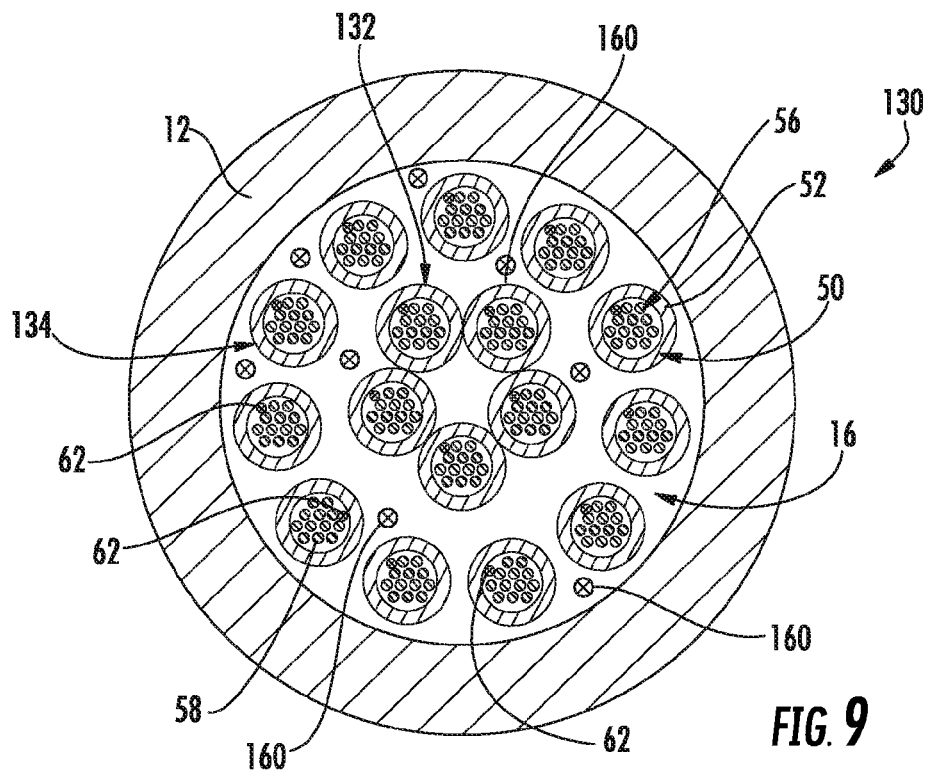
FIG. 9 is a cross-sectional view of a cable according to another exemplary embodiment.
Figure 10:
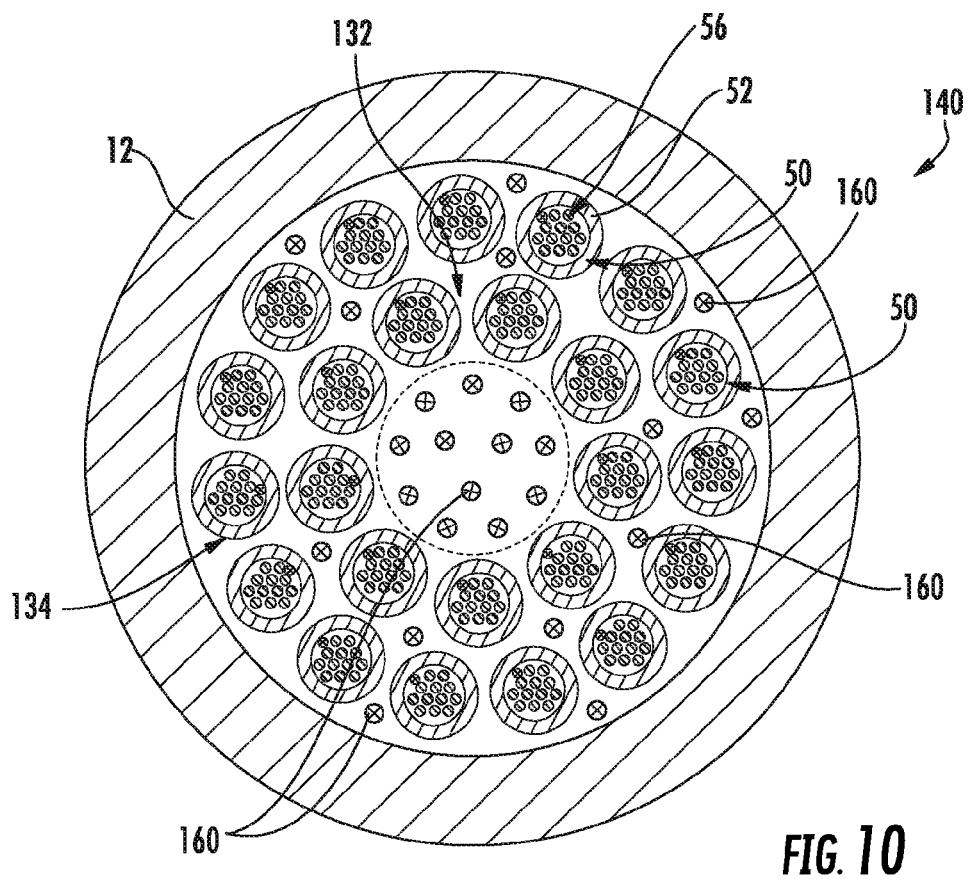
FIG. 10 is a cross-sectional view of a cable according to another exemplary embodiment.
Figure 11:
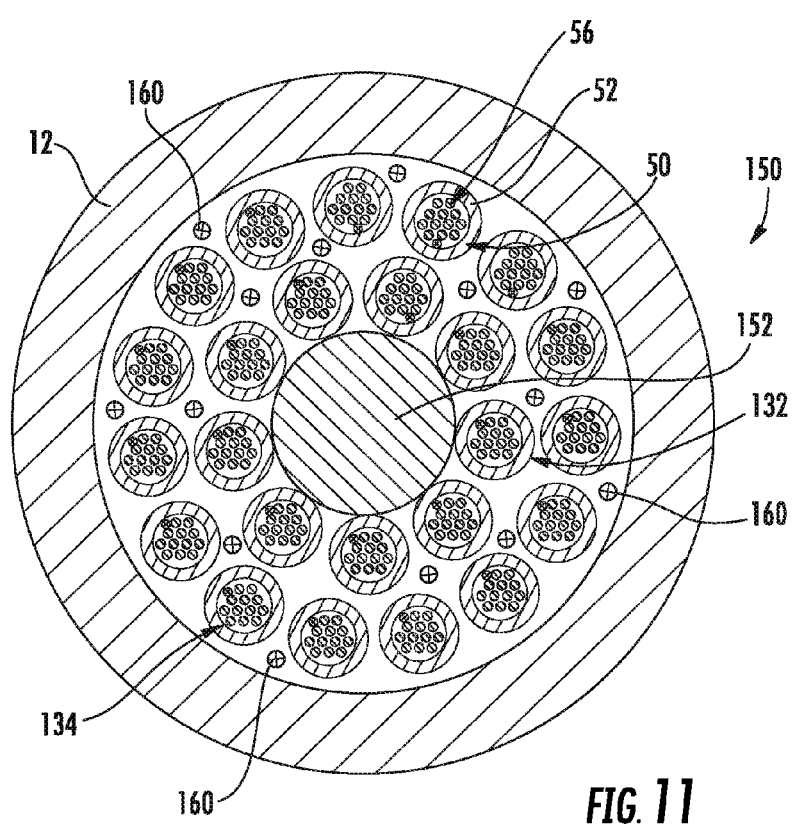
FIG. 11 is a cross-sectional view of a cable according to another exemplary embodiment.

Referring to FIGS. 9-11, additional embodiments of an optical fiber cable are shown. In general, the cable embodiments shown in FIGS. 9-11, include optical transmission units, shown as subunits 50, that are unbundled within cable jacket 12. In such embodiments, the cables do not include bundle jackets, and as explained in more detail below, the cable embodiments of FIGS. 9-11 include tensile strength strands 160 that are located within cable jacket 12 and outside of subunits 50 without being bundled within a bundle jacket, but are otherwise substantially the same as and function in the same manner as bundle yarn strands 60 discussed above.

Referring to FIG. 9, an optical fiber cable 130 is shown according to an exemplary embodiment. Cable 130 is substantially the same as cable 10 except as discussed herein. In this embodiment, cable 130 includes a plurality of optical transmission units, shown as unbundled subunits 50. In cable 130, subunits 50 are not surrounded and group by bundle jackets located within cable jacket 12.

As shown in FIG. 9, subunits 50 within cable 130 are arranged into an inner group 132 of subunits 50 and an outer group 134 of subunits 50. In general, inner group 132 is located in the central region of bore 16, and outer group 134 is located around and surrounding inner group 132. In the specific embodiment shown, cable 130 includes five subunits 50 within inner group 132 and eleven subunits 50 within outer group 134. In some such embodiments, each subunit 50 includes 12 optical fibers 58, such that cable 130 includes a total of 192 optical fibers. In various embodiments, cable 130 may be configured to include between 150 and 250 total optical fibers. In various embodiments to account for the different fiber counts, inner group 132 may include three, four, etc. subunits 50 and outer group 134 may include less than eleven subunits 50 or more than eleven subunits 50. While the embodiments discussed herein relate primarily to a cable having two groups or layers (an inner group and an outer group) of subunits 50, in other embodiments, cable 130 may include three, four, five or more concentric groups of subunits 50.

Similar to the wrapped bundles shown in FIG. 2, in various embodiments, both inner group 132 and outer group 134 of subunits 50 are wrapped, twisted or stranded to form a wrapped pattern within bore 16. Similar to the wrapped patterns of bundles 20 discussed above, inner group 132 of subunits 50 are wrapped around each other forming a first wrapped pattern, and outer group 134 of subunits 50 are wrapped around inner group 132 forming a second wrapped pattern. In various embodiments, the first wrapped pattern and second wrapped pattern each include at least one spirally wrapped or twisted portion. In various embodiments, the first wrapped pattern of inner group 132 is different from the second wrapped pattern of outer group 134. In general, the wrapped patterns of inner group 132 and outer group 134 are selected such that the length of the subunits 50 (and consequently lengths of the optical fibers within each subunit 50) are substantially the same as the other subunits 50 and other fibers of cable 130 (e.g., lengths of all subunits and all fibers of cable 130 are within 0.6% of each other and more specifically within 0.1% of each other, as discussed in more detail below).

In general, the equal lengths between the inner group 132 and outer group 134 are achieved through the inner group 132 having a tighter spiral pattern than outer group 134, and thus the tighter wrapped pattern of inner group 132 accounts for the smaller diameter of group 132 as compared to outer group 134 resulting in the substantially same lengths of subunits and fibers between inner group 132 and outer group 134. In a specific embodiment, the wrapped patterns of inner group 132 and outer group 134 are selected such that the lengths of subunits 50 of each group are substantially the same as the other subunits 50 within at least one, 1 meter section of cable 130.

In various embodiments, the differential wrapping between inner group 132 and outer group 134 provide for a cable 130 that allows for a high fiber density cable with characteristics suitable for use in indoor data center applications. The substantially equal lengths of subunits 50 (and of optical fibers within the bundles) between inner group 132 and outer group 134 results in a cable 130 with relatively low skew between the fibers of different subunits 50. This may facilitate usage of cable 130 in conjunction with certain data center communications equipment, for example parallel optics transmission equipment. In various embodiments, this stranding arrangement results in a cable 130 that has relatively low skew meaning that the difference in transit time for optical communication signals traveling in the optical fibers of outer group 134 versus the transmit time for optical communication signals traveling in the optical fibers of inner group 132 is less than 20 picoseconds/meter of cable (ps/m) and more specifically is less than 10 ps/m. In addition, the substantially equal length of subunits 50 (and optical fibers within the subunits) between inner group 132 and outer group 134 results in substantially even tension distribution between the optical fibers of outer group 134 and inner group 132.

Referring to FIG. 9, cable 130 includes at least one first tensile strength strand, shown as a plurality of yarn strands 160, located within bore 16 of cable jacket 12 but outside of subunits 50. In general yarn strands 160 provide substantially the same functions as bundle yarn strands 60 discussed above, but without the bundle jackets associating one or more yarn strands 160 with particular subunits 50. In the embodiment of FIG. 9, yarn strands 160 are located within and distributed throughout bore 16 without grouping or association with particular subunits 50. In various embodiments, yarn strands 160 may be arranged in a group or layer in the center of bore 16, in a group or layer between inner group 132 and outer group 134, and/or in a group or layer between outer group 134 and the inner surface of jacket 12. In some such embodiments, cable 130 does not include a central strength member, such as a glass-reinforced plastic (GRP) rod, present in the center of many optical fiber cables.

In various embodiments, yarn strands 160 are unstranded (e.g., are not wrapped around the outside of subunits 50) such that yarn strands 160 are substantially the same length as bore 16 and as cable jacket 12. As will be understood, in this arrangement, because subunits 50 are stranded in a wrapped pattern, the total axial length of yarn strands 160 is less than the total axial length of subunits 50 and is less than the total axial length of optical fibers 58 within each subunit. In various embodiments, the total axial length of yarn strands 160 is between 0.05% and 0.4% and more specifically between 0.1% and 0.2% less than the total axial length of subunits 50 and the total axial length of optical fibers 58 within each subunit. As explained in more detail below, this arrangement results in a cable in which tension applied to the cable is primarily transmitted by and experienced by yarn strands 160 rather than optical fibers 58.

In various embodiments, yarn strands 160 may be any suitable tensile strength yarn or fibrous material used in cable construction. In various embodiments, yarn strands 160 are formed from an aramid yarn material. In other embodiments, the tensile strength strands of cable 130 may be fiberglass yarn, poly(p-phenylene-2,6-benzobisoxazole) yarn sold under the trade Zylon, polyester-polyarylate liquid crystal polymer fiber sold under the trade name Vectran, or other high strength tensile yarns.

Referring to FIG. 10, an optical fiber cable 140 is shown according to an exemplary embodiment. Cable 140 is substantially the same as cable 130 except as discussed herein. Cable 140 is a 288 fiber cable that includes nine subunits 50 in inner group 132 and fifteen subunits 50 in outer group 134. As shown in FIG. 10, cable 140 may include a group of yarn strands 160 located in the center of inner group 132, and in this embodiment, subunits 50 of inner group 132 may be stranded around the central group of yarn strands 160. As shown in FIG. 10, in place of or in addition to the central group of yarn strands 160, cable 140 may include additional yarn strands 160 located between inner group 132 and outer group 134 and between outer group 134 and cable jacket 12.

Referring to FIG. 11, an optical fiber cable 150 is shown according to an exemplary embodiment. Cable 150 is substantially the same as cable 140 except as discussed herein. As shown in FIG. 11, cable 140 may include an elongate central strength member 152, such as a GRP rod, steel rod, etc., located in the center of inner group 132. In this embodiment, subunits 50 of inner group 132 are stranded around strength member 152. As shown in FIG. 11, cable 150 may include yarn strands 160 located between inner group 132 and outer group 134 and between outer group 134 and cable jacket 12.

Figure 12:
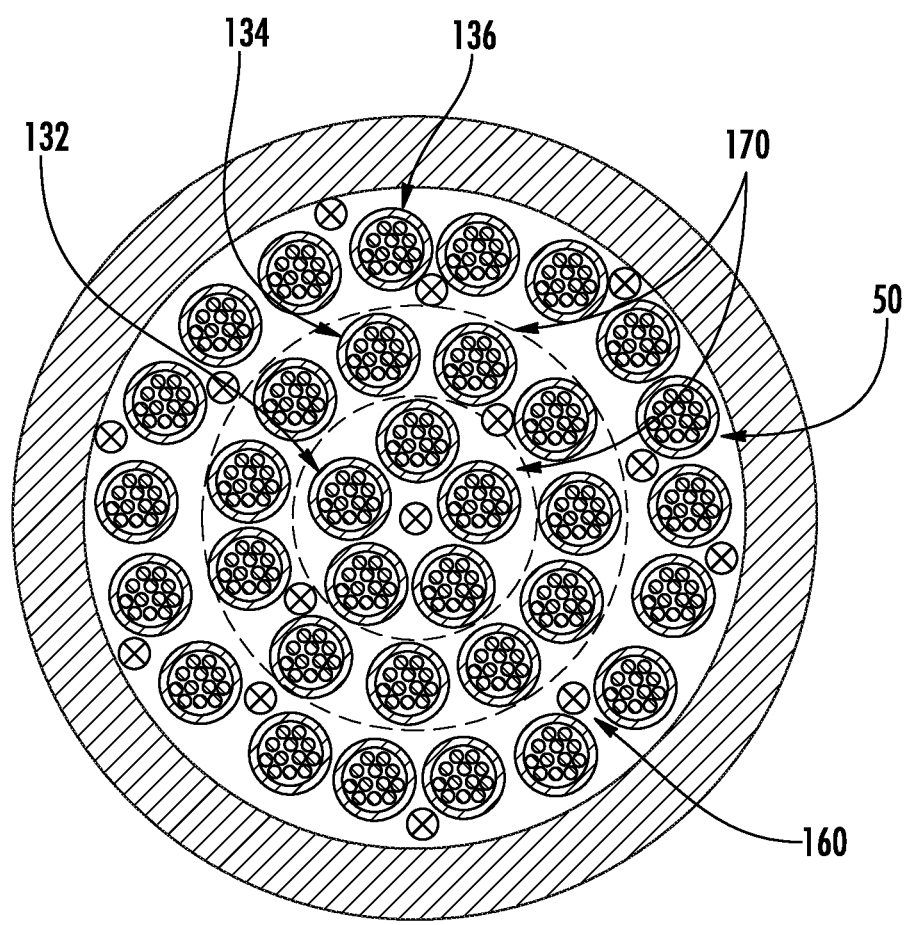
FIG. 12 is a cross-sectional view of a cable according to another exemplary embodiment.

Referring to FIG. 12, an optical fiber cable 170 is shown according to an exemplary embodiment. As shown in FIG. 12, cable 170 may be free of an elongate central strength member, such as a GRP rod, steel rod, etc., located in the center of inner group 132. In this embodiment, subunits 50 of inner group 132 may be stranded around a central strength member 172 that may be an aramid yarn strand, for example. As shown in FIG. 12, cable 170 may include a third outer group 136 of stranded subunits 50 in which the pitch length of the third outer group 136 is greater than the pitch length of the outer group 134 such that the length of the fibers in the third outer group 136 are substantially the same as the length of the fibers in the inner group 132 and outer group 134. The third outer group 136 may be wrapped in an SZ wrapped pattern (also referred to as an SZ stranding pattern). As also shown in FIG. 12, binder yarn strands 160 may be located between inner group 132 and first outer group 134, between outer group 134 and second outer group 136, and between second outer group 136 and cable jacket 12.

In various embodiments, subunits 50 can include a wide variety of optical fibers including multi-mode fibers, single mode fibers, bend insensitive fibers, etc. In various embodiments, cable jacket 12, bundle jacket 40 and subunit sheath 52 may be a variety of materials used in cable manufacturing, such as medium density polyethylene, polyvinyl chloride (PVC), polyvinylidene difluoride (PVDF), nylon, polyester or polycarbonate and their copolymers. In addition, the material of cable jacket 12, bundle jacket 40 and subunits sheath 52 may include quantities of other materials or fillers that provide different properties to the material of cable jacket 12. For example, the material of cable jacket 12 may include materials that provide for coloring, UV/light blocking (e.g., carbon black), fire resistance as discussed above, etc.

While the specific cable embodiments discussed herein and shown in the figures relate primarily to cables, bundles and subunits that have a substantially circular cross-sectional shape defining substantially cylindrical internal bores, in other embodiments, the cables, bundles and subunits discussed herein may have any number of cross-section shapes. For example, in various embodiments, cable jacket 12, bundle jacket 40 and subunits sheath 52 may have an oval, elliptical, square, rectangular, triangular or other cross-sectional shape. In such embodiments, the passage or lumen of the cable jacket 12, bundle jacket 40 and subunits sheath 52 may be the same shape or different shape than the shape of cable jacket 12, bundle jacket 40 and subunits sheath 52. In some embodiments, cable jacket 12, bundle jacket 40 and subunits sheath 52 may define more than one channel or passage. In such embodiments, the multiple channels may be of the same size and shape as each other or may each have different sizes or shapes.

Figure 13:
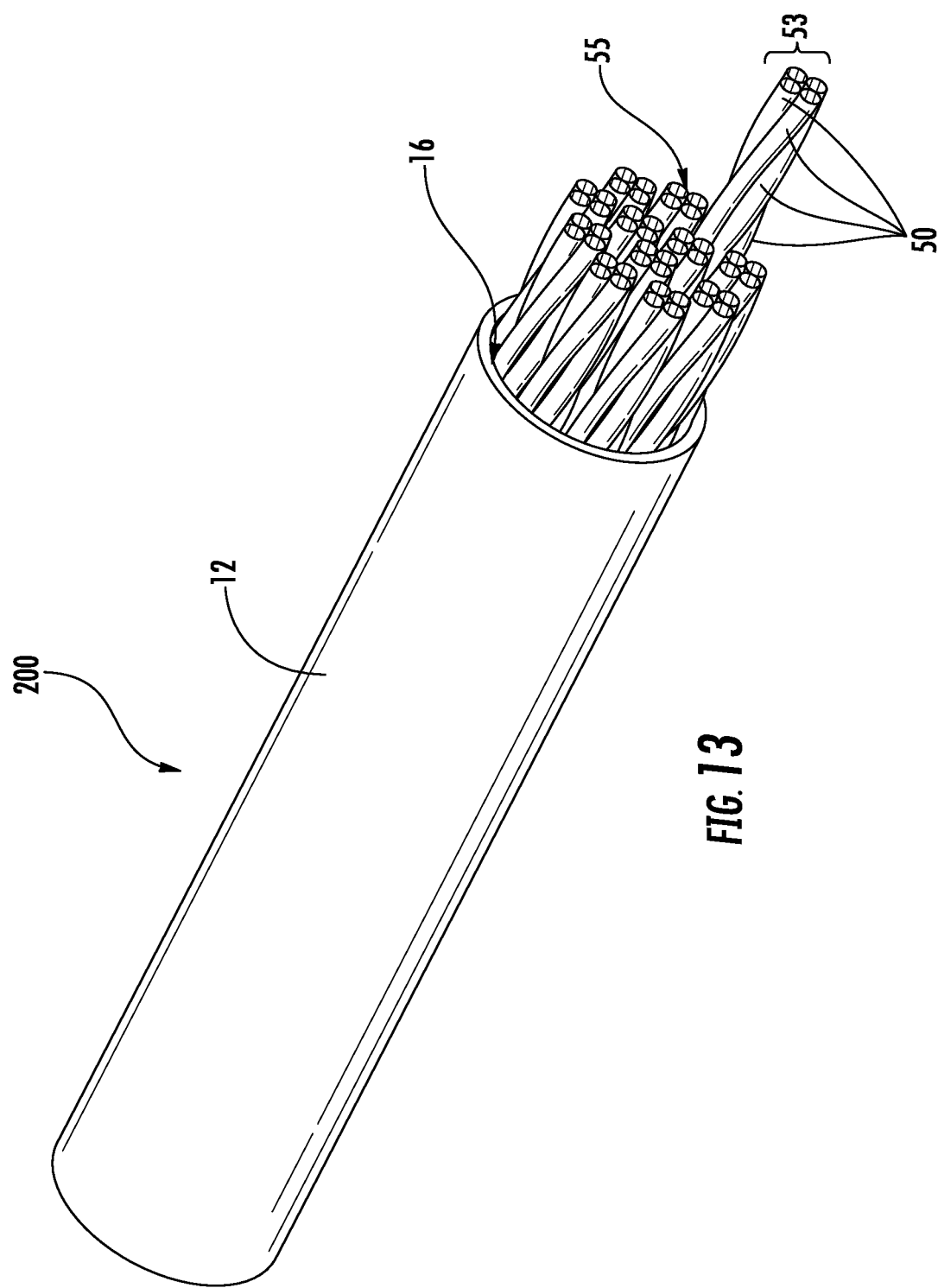
FIG. 13 is a perspective view of an optical fiber cable according to another exemplary embodiment.

In accordance with yet other aspects of the present disclosure, as shown in FIG. 13, for example, an optical fiber cable 200 may be a high fiber count cable (e.g., 576 fibers) that is constructed by helically stranding four subunits 50 together with a short lay length to form a stranded subunit group 53. Because the of helical stranding with short lay length, the stranded subunits 50 are sufficiently bound together that a bundle jacket 40 is no longer necessary to hold the subunits 50 together. In accordance with yet other aspects of the present disclosure, a plurality of the stranded subunit groups 53 may then be stranded together to form a stranded cable core 55 comprised of the plurality of stranded subunit groups 53. For example, in FIG. 13, twelve stranded subunit groups are shown forming the stranded cable core 55 inside the bore 16 of cable jacket 12. As noted infra, aramid yarn may be incorporated as strength members in or around the subunits 50, the stranded subunit groups 53, and/or the stranded cable core 55.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In addition to the subunits 50 and bundles of subunits 50 discussed above, optical transmission units as discussed herein may include optical fiber ribbons, tight-buffered optical fibers, optical fiber micromodules, etc.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:
   an outer cable layer;
   a plurality of optical fiber bundles surrounded by the outer cable layer, each optical fiber bundle comprising:
      a bundle jacket defining a bundle passage;
      a first tensile strength strand located within the bundle passage; and
      a plurality of optical fiber subunits located within the bundle passage, the plurality of optical subunits are wrapped around each other within the bundle passage forming a wrapped pattern, each optical fiber subunit comprising:
         a subunit jacket defining a subunit passage;
         a second tensile strength strand located within the subunit passage; and
         an elongate optical fiber located within the subunit passage;
   wherein the first tensile strength strand of each optical fiber bundle is located outside of the jackets of the optical fiber subunits;
   wherein a length of the second tensile strength strand is substantially the same as a length of the elongate optical fiber; and
   wherein a length of the first tensile strength strand is less than the length of the second tensile strength strand and the length of the elongate optical fiber.

2. The optical communication cable of claim 1, wherein the outer cable layer is formed from an extrudable fire resistant polymer material, wherein the bundle jacket is formed from an extrudable fire resistant polymer material, wherein the subunit jacket is formed from an extrudable fire resistant polymer material, and wherein the total number of elongate optical fibers within the outer cable layer is greater than 288 and an outer diameter of the outer cable layer is less than 30 mm.

3. The optical communication cable of claim 2, wherein the optical communication cable is plenum burn test rated as described in NFPA 262.

4. The optical communication cable of claim 1, wherein the first tensile strength strand is unstranded within the bundle passage, and wherein the second tensile strength strand is unstranded within the subunit passage.

5. The optical communication cable of claim 4, wherein each optical fiber subunit includes a plurality of elongate optical fibers located within the subunit passage, and the plurality of elongate optical fibers are unstranded within the subunit passage.

6. The optical communication cable of claim 1 in an optical communication cable assembly comprising a furcation plug, wherein the outer cable layer is an outer cable jacket, wherein the outer cable jacket is coupled to a first end of the furcation plug such that the outer cable jacket terminates at the furcation plug and that each of the optical fiber subunits extends out of a second end of the furcation plug such that an outer surface of the outer cable jacket defines an outermost surface of the cable on an upstream side of the furcation plug and an outer surface of each subunit jacket defines an outermost surface of the cable on a downstream side of the furcation plug, and further wherein the first tensile strands of at least some of the optical fiber bundles are bonded to the furcation plug such that tension applied to the furcation plug is borne at least in part by the first tensile strength strands.

7. The optical communication cable assembly of claim 6, further comprising:
an optical fiber connector coupled to an end of each optical fiber subunit located downstream from the furcation plug, wherein the second tensile strength strands of at least some of the optical subunits are bonded to the optical fiber connector associated with the optical fiber subunit.

8. The optical communication cable of claim 1, wherein the first tensile strength strand and the second strength strand are formed from aramid fibers.

9. The optical communication cable of claim 1, wherein the bundle jacket comprises a thin wall formed from a low strength material to promote removal of the bundle jacket by manually tearing the bundle jacket with fingers.

10. The optical communication cable of claim 1, wherein the bundle jacket comprises one or more stranded binder yarns that define a passage for the optical fiber subunits and the strength strands.

11. The optical communication cable of claim 1, wherein at least one optical fiber subunit is a filler rod.

12. The optical communication cable of claim 1, wherein the optical communication cable achieves at least a Class Dca rating with the European construction products regulation for fire safety when tested to EN50339, EN61034-2, EN60754-2, and EN60332-1-2.

13. A high density fire resistant optical communication cable comprising:
a cable body including a body passage within the cable body, the cable body formed from a fire resistant polymer material;
a plurality of optical fiber bundles located within the body passage, each optical fiber bundle comprising:
a bundle jacket formed from a fire resistant polymer material and defining a bundle passage; and
a plurality of optical fiber subunits located with the bundle passage, each optical fiber subunit comprising:
a subunit jacket formed from a fire resistant polymer material defining a subunit passage; and
a plurality of elongate optical fibers located within the subunit passage;
wherein the plurality of optical fiber bundles includes an outer group of optical fiber bundles and an inner group of optical fiber bundles;
wherein the inner group of optical fiber bundles is wrapped around each other forming a first wrapped pattern that includes at least one spirally wrapped section having a first pitch length; and
wherein the outer group of optical fiber bundles surround and are wrapped around the inner group of optical fiber bundles forming a second wrapped pattern that includes at least one spirally wrapped section having a second pitch length;
wherein the second pitch length is greater than the first pitch length such that a total length of each optical fiber of the outer group of optical fiber bundles is substantially the same as a total length of each optical fiber of the inner group of optical fiber bundles within at least one 1 meter length of the cable.

14. The high density fire resistant optical communication cable of claim 13, further comprising:
a first tensile strength strand located within the bundle passage of each optical fiber bundle and second tensile strength strand located within the subunit passage of each optical fiber subunit, wherein the first tensile strength strand of each optical fiber bundle is located outside of the subunit jackets, and wherein a length of at least one first tensile strength strand is less than the length of at least one second tensile strength strand.

15. The high density fire resistant optical communication cable of claim 14, wherein each optical fiber subunit includes at least two elongate optical fibers, wherein each optical fiber bundle includes at least two optical fiber subunits, wherein the number of optical fiber bundles is at least twelve, and wherein a greatest outer dimension of the cable body is less than 28 mm.

16. The high density fire resistant optical communication cable of claim 13, wherein the first pitch length is between 125 mm and 350 mm and the second pitch length is between 300 mm and 900 mm.

17. The high density fire resistant optical communication cable of claim 16, wherein the first wrapped pattern is an SZ stranding pattern and second wrapped pattern is an SZ stranding pattern.

18. The high density fire resistant optical communication cable of claim 13, wherein the cable is plenum burn test rated as described in NFPA 262.

19. The high density fire resistant optical communication cable of claim 13, wherein the cable passes the European construction products regulation for fire safety when tested to EN60332-3.

20. The high density fire resistant optical communication cable of claim 19, wherein the secondary fire resistant material is at least one of an intumescent material and a metal hydroxide material.

21. The high density fire resistant optical communication cable of claim 13, further comprising:
water block materials located within the cable body and a UV resistant material located in a material of the cable body.

22. The high density fire resistant optical communication cable of claim 13, further comprising:
an armor layer and wherein the cable body is a cable jacket layer located outside of and surrounding the armor layer.

23. The high density fire resistant optical communication cable of claim 13, wherein the difference in transit time for an optical communication signal traveling in the optical fibers of the outer group of optical fiber bundles versus the transmit time for an optical communication signal traveling in the optical fibers of the inner group of optical fiber bundles is less than 20 picoseconds/meter of cable.

24. A high density fire resistant optical communication cable comprising:
a cable body including a body passage within the cable body, the cable body formed from a fire resistant polymer material;
a plurality of optical fiber bundles located within the body passage, each optical fiber bundle comprising:
a bundle jacket formed from a fire resistant polymer material and defining a bundle passage;
a first tensile strength strand located and unstranded within the bundle passage; and
a plurality of optical fiber subunits located within the bundle passage, each optical fiber subunit comprising:
a subunit jacket formed from a fire resistant polymer material defining a subunit passage;
a second tensile strength strand located and unstranded within the subunit passage; and
a plurality of elongate optical fibers located within the subunit passage;
wherein the plurality of optical fiber bundles includes an outer group of optical fiber bundles and an inner group of optical fiber bundles;
wherein the inner group of optical fiber bundles is wrapped around each other forming a first wrapped pattern that includes at least one spirally wrapped section having a first pitch length;
wherein the outer group of optical fiber bundles surround and are wrapped around the inner group of optical fiber bundles forming a second wrapped pattern that includes at least one spirally wrapped section having a second pitch length;
wherein the second pitch length is greater than the first pitch length such that a total length of each optical fiber of the outer group of optical fiber bundles is substantially the same as a total length of each optical fiber of the inner group of optical fiber bundles;
wherein the first tensile strength strand of each optical fiber bundle is located outside of the subunit jackets;
wherein a length of each second tensile strength strand is substantially the same as a length of the elongate optical fibers of the optical fiber subunit in which the second tensile strength strand is located;
wherein a length of each first tensile strength strand is less than the length of at least one elongate optical fiber;
wherein the total number of elongate optical fibers within the cable body is at least 288 and a greatest outer dimension of the cable body is less than 30 mm.

25. The high density fire resistant optical communication cable of claim 24, wherein the first pitch length is between 125 mm and 350 mm and the second pitch length is between 300 mm and 900 mm.

26. The high density fire resistant optical communication cable of claim 25, wherein each optical fiber subunit includes at least two elongate optical fibers, wherein each optical fiber bundle includes at least three optical fiber subunits, wherein the number of optical fiber bundles is at least twelve, and wherein the greatest outer dimension of the cable body is less than 28 mm.

27. The high density fire resistant optical communication cable of claim 25, further comprising:
a third tensile strength strand located and unstranded in the body passage.

28. An optical communication cable assembly comprising:
an outer cable jacket;
a plurality of optical fiber bundles surrounded by the outer cable jacket, each optical fiber bundle comprising:
a bundle jacket defining a bundle passage;
a first tensile strength strand located within the bundle passage; and
a plurality of optical fiber subunits located with the bundle passage, the plurality of optical subunits are wrapped around each other within the bundle passage forming a wrapped pattern, each optical fiber subunit comprising:
a subunit jacket defining a subunit passage;
a second tensile strength strand located within the subunit passage; and
an elongate optical fiber located within the subunit passage;
wherein the first tensile strength strand of each optical fiber bundle is located outside of the jackets of the optical fiber subunits, wherein a length of the second tensile strength strand is substantially the same as a length of the elongate optical fiber, and wherein a length of the first tensile strength strand is less than the length of the second tensile strength strand and the length of the elongate optical fiber; and
a furcation plug, wherein the outer cable jacket is coupled to a first end of the furcation plug such that the outer cable jacket terminates at the furcation plug and that each of the optical fiber subunits extends out of a second end of the furcation plug such that an outer surface of the outer cable jacket defines an outermost surface of the assembly on an upstream side of the furcation plug and an outer surface of each subunit jacket defines an outermost surface of the assembly on a downstream side of the furcation plug, and further wherein the first tensile strands of at least some of the optical fiber bundles are bonded to the furcation plug such that tension applied to the furcation plug is borne at least in part by the first tensile strength strands.

29. An optical communication cable comprising:
a cable body including a body passage within the cable body;
a plurality of optical transmission units located within the body passage, each optical transmission unit including at least one optical fiber;
wherein the plurality of optical transmission units include an outer group of optical transmission units and an inner group of optical transmission units;
wherein the inner group of optical transmission units is wrapped around each other forming a first wrapped pattern that includes at least one spirally wrapped section having a first pitch length;
wherein the outer group of optical transmission units surround and are wrapped around the inner group of optical transmission units forming a second wrapped pattern that includes at least one spirally wrapped section having a second pitch length; and wherein the second pitch length is greater than the first pitch length such that a total length of each optical fiber of the outer group of optical transmission units is substantially the same as a total length of each optical fiber of the inner group of optical transmission units within at least one 1 meter length of the cable.

30. The optical communication cable of claim 29, further comprising:
a plurality of first tensile strength strands located inside the body passage and outside of the optical transmission units; and
a plurality of second tensile strength strands each located within one of the optical transmission units;
wherein the lengths of the first tensile strength strands are less than the lengths of the second tensile strength strands.

31. The optical communication cable of claim 30, wherein the first pitch length is between 80 mm and 300 mm and the second pitch length is between 150 mm and 600 mm.

32. The optical communication cable of claim 30, wherein the first wrapped pattern is an SZ stranding pattern and second wrapped pattern is an SZ stranding pattern.

33. The optical communication cable of claim 32 further comprising:
a central strength member located within the body passage, wherein the inner group of optical transmission units is wrapped around the central strength member.

34. The optical communication cable of claim 30, wherein the difference in transit time for an optical communication signal traveling in the optical fibers of the outer group of optical transmission units versus the transmit time for an optical communication signal traveling in the optical fibers of the inner group of optical transmission units is less than 20 picoseconds/meter of cable.

35. The optical communication cable of claim 30, wherein the optical transmission units are optical fiber subunits each including a subunit jacket surrounding a plurality of optical fibers.

36. The optical communication cable of claim 30, wherein the optical transmission units are optical fiber bundles each including a bundle jacket surrounding a plurality of optical fiber subunits, and wherein each optical fiber subunit includes a subunit jacket surrounding a plurality of optical fibers.

37. The optical communication cable of claim 30, wherein at least one of the cable body and the optical transmission units includes a fire resistant polymer material such that the cable is plenum burn test rated as described in NFPA 262.

38. The optical communication cable of claim 29, further comprising:
a third group of transmission units, wherein the third group of transmission units surround and are wrapped around the outer group of optical transmission units forming a third wrapped pattern that includes at least one spirally wrapped section having a third pitch length, and wherein the third pitch length is greater than the second pitch length such that a total length of each optical fiber of the third group of optical transmission units is substantially the same as a total length of each optical fiber of the outer group or the inner group of optical transmission units.

39. The optical communication cable of claim 38, further comprising binder yarns positioned around each of the inner group, the outer group, and the third group of transmission units respectively.

40. An optical communication cable assembly comprising:
an outer cable jacket;
a plurality of first tensile strength strands surrounded by the outer cable jacket;
a plurality of optical transmission units surrounded by the outer cable jacket, each optical transmission unit comprising:
an inner jacket defining a passage;
at least one elongate optical fiber located within the passage;
a second tensile strength strand located within the passage;
wherein the first tensile strength strands are located outside of the inner jackets of the optical transmission units;
wherein lengths of the first tensile strength strands are less than lengths of the second tensile strength strands and are less than lengths of the elongate optical fiber of each of the optical transmission units; and
a furcation plug, wherein the outer cable jacket is coupled to a first end of the furcation plug such that the outer cable jacket terminates at the furcation plug and that each of the optical transmission units extends out of a second end of the furcation plug such that an outer surface of the outer cable jacket defines an outermost surface of the assembly on an upstream side of the furcation plug, and further wherein the first tensile strands are bonded to the furcation plug such that tension applied to the furcation plug is borne at least in part by the first tensile strength strands,
wherein the subunits are substantially the same length, and
wherein the optical skew between subunits is less than 30 ps/m.

41. The optical communication cable assembly of claim 40, wherein the optical transmission units are optical fiber subunits each including at least two elongate optical fibers within the passage, wherein the inner jacket is a subunit jacket surrounding the at least two elongated optical fibers, and wherein the at least two elongate optical fibers are unstranded relative to each other within the passage.

42. The optical communication cable assembly of claim 40, further comprising:
a plurality of bundle jackets each surrounding a plurality of optical fiber subunits such that each bundle jacket defines an optical fiber bundle, wherein at least one first tensile strength strand is located within each bundle jacket.

* * * * *